(12) United States Patent
Tanaka et al.

(10) Patent No.: US 12,446,032 B2
(45) Date of Patent: Oct. 14, 2025

(54) COMMUNICATION APPARATUS AND COMMUNICATION METHOD

(71) Applicant: SONY GROUP CORPORATION, Tokyo (JP)

(72) Inventors: Yusuke Tanaka, Tokyo (JP); Yuichi Morioka, Kanagawa (JP); Tomoya Yamaura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/538,734

(22) Filed: Dec. 13, 2023

(65) Prior Publication Data

US 2024/0121777 A1 Apr. 11, 2024

Related U.S. Application Data

(63) Continuation of application No. 16/603,334, filed as application No. PCT/JP2018/010698 on Mar. 19, 2018, now Pat. No. 11,877,279.

(30) Foreign Application Priority Data

May 16, 2017 (JP) ................................ 2017-097167

(51) Int. Cl.
*H04W 72/1268* (2023.01)
*H04W 48/06* (2009.01)
(Continued)

(52) U.S. Cl.
CPC ....... *H04W 72/1268* (2013.01); *H04W 48/06* (2013.01); *H04W 72/0446* (2013.01); *H04W 72/30* (2023.01); *H04W 74/085* (2013.01)

(58) Field of Classification Search
None
See application file for complete search history.

(56) References Cited

U.S. PATENT DOCUMENTS

| 11,877,279 B2* | 1/2024 | Tanaka ................. H04W 74/04 |
| 2005/0169177 A1 | 8/2005 | Park et al. |

(Continued)

FOREIGN PATENT DOCUMENTS

| CN | 103493571 A | 1/2014 |
| CN | 106134122 A | 11/2016 |

(Continued)

OTHER PUBLICATIONS

Office Action for EP Patent Application No. 18802274.3, issued on Oct. 5, 2021, 08 pages of Office Action.

(Continued)

*Primary Examiner* — Jutai Kao
(74) *Attorney, Agent, or Firm* — CHIP LAW GROUP

(57) ABSTRACT

A communication apparatus and a communication apparatus that perform wireless communication by a multi-user method are provided. The communication apparatus includes a communication section configured to transmit and receive a wireless signal and a control section configured to control operation as a base station, and transmits a frame that includes schedule information relating to scheduled communication of the own station and can be received by a different wireless terminal and receives schedule information relating to scheduled information of a different base station. The scheduled communication includes multi-user communication of an uplink, and the schedule information includes information relating to a transmission schedule of a frame for inducing multi-user communication of an uplink.

17 Claims, 12 Drawing Sheets

(51) Int. Cl.
*H04W 72/0446* (2023.01)
*H04W 72/30* (2023.01)
*H04W 74/0833* (2024.01)

(56) References Cited

U.S. PATENT DOCUMENTS

| | | | |
|---|---|---|---|
| 2005/0169192 | A1 | 8/2005 | Park et al. |
| 2005/0169222 | A1 | 8/2005 | Ayyagari et al. |
| 2005/0169307 | A1 | 8/2005 | Ayyagari et al. |
| 2005/0170835 | A1 | 8/2005 | Ayyagari et al. |
| 2005/0193116 | A1 | 9/2005 | Ayyagari et al. |
| 2009/0196174 | A1 | 8/2009 | Ji |
| 2010/0004002 | A1 | 1/2010 | Hahn et al. |
| 2010/0111096 | A1 | 5/2010 | Ayyagari et al. |
| 2010/0238901 | A1 | 9/2010 | Sampath et al. |
| 2011/0268094 | A1 | 11/2011 | Gong et al. |
| 2013/0143583 | A1 | 6/2013 | Son et al. |
| 2014/0050183 | A1 | 2/2014 | Mochizuki et al. |
| 2014/0293911 | A1* | 10/2014 | Cheong ............... H04L 27/2657 370/329 |
| 2014/0335891 | A1 | 11/2014 | Zhang et al. |
| 2015/0146654 | A1 | 5/2015 | Chu et al. |
| 2015/0189570 | A1 | 7/2015 | Chang et al. |
| 2015/0282206 | A1* | 10/2015 | Kalhan ............. H04W 72/0446 370/330 |
| 2016/0087700 | A1 | 3/2016 | Chu et al. |
| 2016/0135199 | A1* | 5/2016 | Wang ................. H04W 72/542 455/450 |
| 2016/0143006 | A1 | 5/2016 | Ghosh et al. |
| 2017/0195107 | A1 | 7/2017 | Liu |
| 2018/0076860 | A1 | 3/2018 | Chu et al. |
| 2019/0014562 | A1 | 1/2019 | Yasukawa et al. |
| 2019/0110315 | A1 | 4/2019 | Park et al. |
| 2019/0182018 | A1 | 6/2019 | Liu |
| 2019/0268914 | A1 | 8/2019 | Adachi et al. |

FOREIGN PATENT DOCUMENTS

| | | |
|---|---|---|
| CN | 106605394 A | 4/2017 |
| DE | 102018216944 A1 | 4/2019 |
| EP | 1690350 A1 | 8/2006 |
| EP | 1692619 A2 | 8/2006 |
| EP | 1692624 A2 | 8/2006 |
| EP | 2248368 A1 | 11/2010 |
| EP | 2409508 A1 | 1/2012 |
| EP | 2786516 A1 | 10/2014 |
| EP | 2904866 A1 | 8/2015 |
| EP | 3075094 A1 | 10/2016 |
| EP | 3188429 A1 | 7/2017 |
| EP | 3220705 A1 | 9/2017 |
| ES | 2377648 T3 | 3/2012 |
| ES | 2401334 T3 | 4/2013 |
| ES | 2922316 T3 | 9/2022 |
| ES | 2940446 T3 | 5/2023 |
| GB | 2560540 A | 9/2018 |
| GB | 2561615 A | 10/2018 |
| GB | 2561918 A | 10/2018 |
| GB | 2567508 A | 4/2019 |
| GB | 2552497 B | 12/2020 |
| GB | 2584024 B | 10/2021 |
| JP | 2007-521765 A | 8/2007 |
| JP | 2007-521766 A | 8/2007 |
| JP | 4401390 B2 | 1/2010 |
| JP | 2011-514719 A | 5/2011 |
| JP | 2012-521679 A | 9/2012 |
| JP | 5437307 B | 3/2014 |
| JP | 2014-207693 A | 10/2014 |
| JP | 2015-531574 A | 11/2015 |
| JP | 5993520 B2 | 9/2016 |
| JP | 2016-540439 A | 12/2016 |
| JP | 2017-055399 A | 3/2017 |
| JP | 6566949 B2 | 8/2019 |
| KR | 10-2013-0061936 A | 6/2013 |
| KR | 10-2016-0090360 A | 7/2016 |
| RU | 2588583 C2 | 7/2016 |
| WO | 2005/045689 A2 | 5/2005 |
| WO | 2005/048047 A2 | 5/2005 |
| WO | 2005/048511 A2 | 5/2005 |
| WO | 2006/052235 A1 | 5/2006 |
| WO | 2009/099844 A1 | 8/2009 |
| WO | 2010/108147 A1 | 9/2010 |
| WO | 2012/147718 A1 | 11/2012 |
| WO | 2013/081411 A1 | 6/2013 |
| WO | 2014/058878 A1 | 4/2014 |
| WO | 2015/081179 A1 | 6/2015 |
| WO | 2016/041205 A1 | 3/2016 |

OTHER PUBLICATIONS

International Search Report and Written Opinion of PCT Application No. PCT/JP2018/010698, issued on May 29, 2018, 12 pages of English Translation and 10 pages of ISRWO.
Office Action for RU Patent Application No. 2019-135903, issued on Mar. 5, 2021, 04 pages of English Translation and 06 pages of Office Action.
Extended European Search Report of EP Application No. 18802274. 3, issued on Mar. 18, 2015, 09 pages.
Notice of Allowance for U.S. Appl. No. 16/603,334, issued on Sep. 6, 2023, 8 pages.
Non-Final Office Action for U.S. Appl. No. 16/603,334, issued on Mar. 9, 2023, 19 pages.
Final Office Action for U.S. Appl. No. 16/603,334, issued on Nov. 16, 2022, 20 pages.
Non-Final Office Action for U.S. Appl. No. 16/603,334, issued on May 23, 2022, 22 pages.
Final Office Action for U.S. Appl. No. 16/603,334, issued on Jan. 26, 2022, 16 pages.
Non-Final Office Action for U.S. Appl. No. 16/603,334, issued on Jul. 20, 2021, 17 pages.
Advisory Action for U.S. Appl. No. 16/603,334, issued on Jan. 26, 2023, 3 pages.
Advisory Action for U.S. Appl. No. 16/603,334, issued on Apr. 15, 2022, 2 pages.
International Preliminary Report on Patentability of PCT Application No. PCT/JP2018/010698, issued on Nov. 28, 2019, 12 pages of English Translation and 07 pages of IPRP.

* cited by examiner

FIG. 9A

EXAMPLE OF CONFIGURATION OF Schedule FRAME

| Frame Control | Duration | Received Address | Transmitter Address | Schedule | Trigger Information | FCS |
|---|---|---|---|---|---|---|

FIG. 9B

EXAMPLE OF CONFIGURATION OF Relay FRAME

| Frame Control | Duration | Received Address | Transmitter Address | Source Address | Schedule | Trigger Information | FCS |
|---|---|---|---|---|---|---|---|

FIG. 9C

EXAMPLE OF CONFIGURATION OF ELEMENT THAT STORES MAPPING INFORMATION

| Element ID | Length | Repeat Number | MAC Address | Association ID |
|---|---|---|---|---|

REPEATED BY NUMBER OF TIMES INDICATED BY Repeat Number (applies to MAC Address and Association ID)

COMMUNICATION APPARATUS AND COMMUNICATION METHOD

CROSS REFERENCE TO RELATED APPLICATIONS

The present application is a continuation application of U.S. patent application Ser. No. 16/603,334, filed on Oct. 7, 2019, which is a National Phase Patent Application of International Application No. PCT/JP2018/010698 filed on Mar. 19, 2018, and which claims priority from Japanese Patent Application JP 2017-097167 filed on May 16, 2017. Each of the above referenced applications is hereby incorporated by reference in its entirety.

TECHNICAL FIELD

The technology disclosed in the present specification relates to a communication apparatus and a communication method that perform wireless communication by a multi-user method.

BACKGROUND ART

Under a situation in which a plurality of wireless terminals exist, efficient communication can be implemented by using multi-user communication in which communication is performed at the same time by multiplication by a plurality of terminals. Especially, in order to perform multi-user communication in an uplink direction, it is necessary for the wireless terminals to cooperate with each other to perform transmission. Therefore, for example, a method is conceivable by which a base station controls transmission of the wireless terminals.

For example, in a wireless LAN representative by IEEE802.11 or the like, increase of the communication speed can be implemented by introducing OFDMA (Orthogonal Frequency Division Multiple Access) and MU-MIMO (Multi User Multi-Input Multi-Output) (for example, refer to PTL 1).

Further, in IEEE802.11ax, in a network configuration in which a plurality of wireless terminals perform communication operation under the control of the base station, a multi-user function assumed that the mode of each wireless terminal is switched to a multi-user mode in response to a trigger frame from the base station (for example, refer to PTL 2). In the trigger frame, resource information, transmission permission terminal information, transmission permission traffic information, communication parameter information and so forth that are designated from the base station to a plurality of subordinate wireless terminals are described. Then, the wireless terminals permitted to perform transmission by the trigger frame perform uplink transmission in accordance with the substance of the description of the frame.

Also, it is assumed that the base station issues a notification of information relating to a schedule of transmission of a trigger frame to its subordinate wireless terminals, and each wireless terminal temporarily suspends operation for the base station within a period within which the trigger frame is not transmitted (transiting to a low-power consumption state, performing communication with some other connected base station, searching for some other base station to be connected).

CITATION LIST

Patent Literature

[PTL 1]
Japanese Patent No. 5437307
[PTL 2]
Japanese Patent Laid-Open No. 2017-55399
[PTL 3]
Japanese Patent Laid-Open No. 2014-207693

SUMMARY

Technical Problem

Then object of the technology disclosed in the present specification is to provide a communication apparatus and a communication method that perform wireless communication by a multi-user method.

Solution to Problem

The technology disclosed in the present specification has been made in view of such a subject as described above, and a first aspect of the technology is a communication apparatus, including:

a communication section configured to transmit and receive a wireless signal; and
a control section configured to control operation as a base station; in which the control section controls transmission of a frame that includes schedule information relating to scheduled communication of the own station and is received by a different wireless terminal or controls reception of schedule information relating to scheduled information of a different base station.

The scheduled communication includes multi-user communication of an uplink. Further, the schedule information includes information relating to a transmission schedule of a frame for inducing multi-user communication of an uplink, and particularly includes information relating to a resource or a transmission method to be used for transmission of a frame for inducing multi-user communication of an uplink.

The communication apparatus that operates as a base station controls scheduled communication of the own station based on the received schedule information of the different base station. In particular, the communication apparatus determines a transmission schedule of a frame for inducing multi-user communication of an uplink, and a resource, information of a transmission permission terminal, a transmission permission traffic and a communication parameter to be used in the multi-user communication of an uplink.

Further, the communication apparatus that operates as a base station can receive the schedule information of a different base station from at least one of a wireless terminal connected to the own station, the different base station or a wireless terminal connected to the different base station. Further, the communication apparatus transmits the frame that is included in a destination address that is received by a wireless terminal connected to the own station, the different base station and a wireless terminal connected to the different base station. The communication apparatus may transmit the frame that includes schedule information of the own station simultaneously with a beacon frame or as part of the beacon frame.

Further, the communication apparatus performs, with a wireless terminal connected to the own station, the different base station or a wireless terminal not connected to the own station, a sequence for confirming whether or not the wireless terminal connected to the own station, the different base station or the wireless terminal not connected to the own station is ready for transmission and reception of the frame including schedule information.

Further, a second aspect of the technology disclosed in the present specification is
a communication method in a communication apparatus that operates as a base station, the communication method comprising including:
a step of transmitting a frame that includes schedule information relating to scheduled information of the own station and is received by a different wireless terminal; and
a step of receiving schedule information relating to scheduled communication of a different base station.

Further, a third aspect of the technology disclosed in the present specification is
a communication apparatus, including:
a communication section configured to transmit and receive a wireless signal; and
a control section configured to control operation as a wireless terminal subordinate of a first base station; in which
the control section controls reception of a frame including schedule information relating to scheduled communication from a second base station to which the own station is not connected and transmission of the schedule information of the second base station to the first base station.

The communication apparatus that operates as a wireless terminal subordinate of a base station transmits the schedule information of the second base station using a frame that has a configuration and contents partly or fully same as those of a different wireless terminal connected to the first base station.

Further, a fourth aspect of the technology disclosed in the present specification is
a communication method in a communication apparatus that operates as a wireless terminal subordinate of a base station, including:
a step of receiving a frame including schedule information relating to scheduled communication from a different base station to which the own station is not connected; and
a step of transmitting the schedule information of the different base station to the base station to which the own station is connected.

Advantageous Effect of Invention

With the technology disclosed in the present specification, a communication apparatus and a communication method by which wireless communication is performed by a multi-user method can be provided.

It is to be noted that the effects described in the present specification are exemplary to the last and the effects of the present disclosure are not limited to them. Further, the present disclosure sometimes demonstrates an additional effect in addition to the effect described above.

Further different objects, features and advantages of the technology disclosed in the present specification will become clear from more detailed description based on the embodiment hereinafter described and the accompanying drawings.

BRIEF DESCRIPTION OF DRAWINGS

FIGS. 9A, 9B, and 9C are views depicting an example of a configuration of a frame.

DESCRIPTION OF EMBODIMENT

Figure 1:
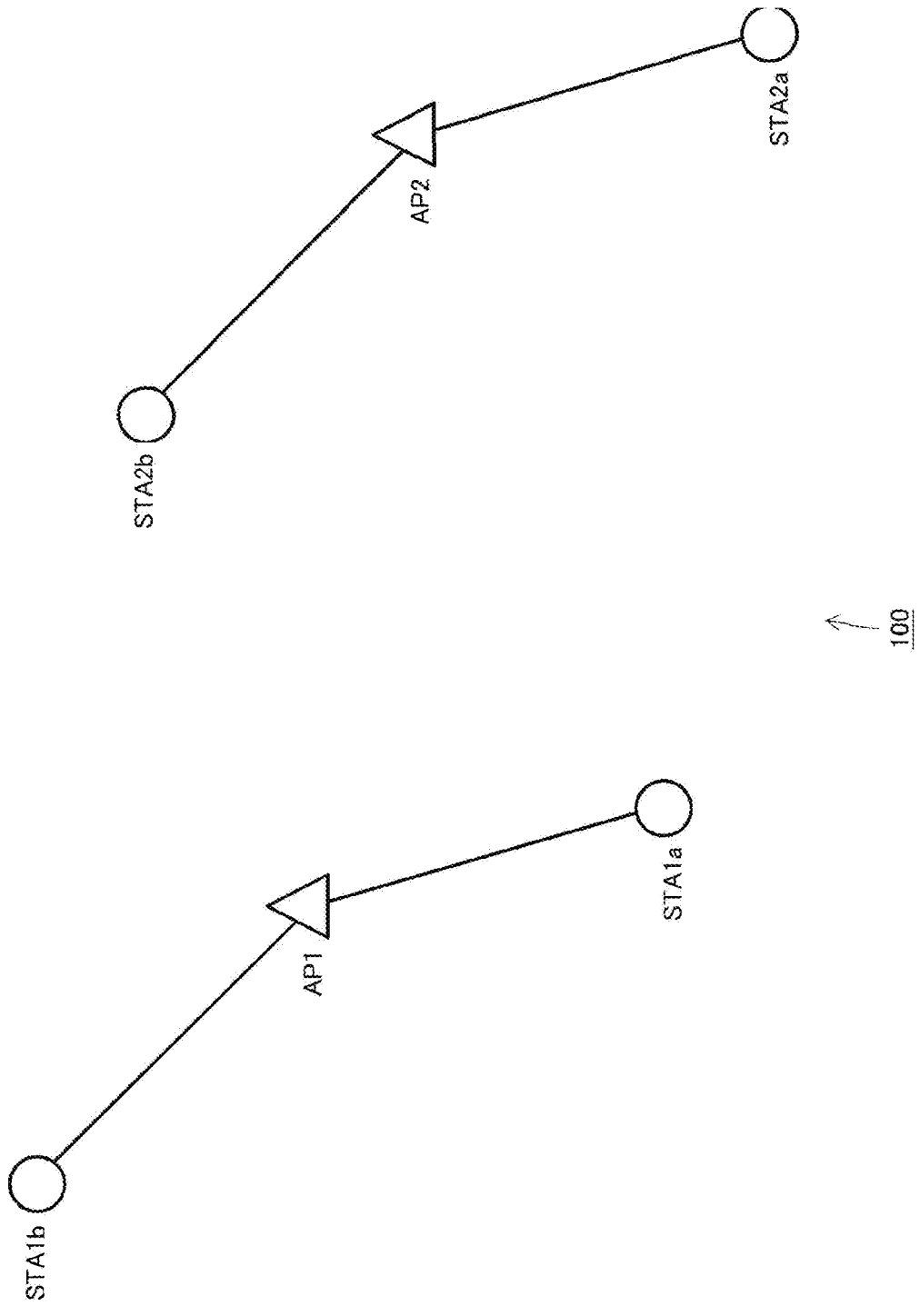
FIG. 1 is a view depicting an example of a configuration of a wireless communication system 100.

In the following, an embodiment of the technology disclosed in the present specification is described in detail with reference to the drawings.

In an infrastructure mode of a wireless LAN represented by IEEE802.11 or the like, a BSS (Basic Service Set) is configured from a base station and a wireless terminal subordinate of the base station, and an ESS (Extended Service Set) is configured from a plurality of BSSs.

In an autonomous distributed wireless communication system, BSSs each configured from a base station and a wireless terminal connected to the base station operate independently of each other. Therefore, even if each BSS determines a schedule of multi-user communication of an uplink on the basis of information in the own BSS, there is the possibility that efficient communication may not be able to implement due to interference from a different BSS.

For example, in a case where a base station detects by its collision avoidance mechanism that a different frame is transmitted thereto, it does not transmit a trigger frame. Therefore, in a case where the base station has a positional relationship that a signal of a different BSS is detected thereby, there is the possibility that the base station cannot transmit a trigger frame on schedule. Further, if a subordinate wireless terminal temporarily suspends its operation within a period during which a trigger frame is not transmitted thereto from the base station, then even if the base station transmits a trigger frame after the collision avoidance, there is the possibility that the trigger frame may not be received correctly by the wireless terminal.

For example, in order to avoid frame collision between BSSs, a method of sharing information relating to transmission time, a frequency, a space and transmission power of a frame such that the base stations operate together has been proposed (for example, refer to PTL 3). However, an additional communication process for sharing information described above gives rise to a problem that an overhead occurs. Further, the collision avoidance method by the information sharing described above presupposes that communication between base stations is possible, and in other words, it is difficult to implement the collision avoidance method in an environment in which communication is not possible between base stations and it is considered that the effect of the collision avoidance method is restrictive.

Therefore, in the present specification, a technology for effectively sharing information relating to multi-user communication of an uplink between BSSs is proposed below.

A base station transmits a frame, which includes information relating to a schedule of the base station itself for transmitting a trigger frame and information relating to multi-user communication of an uplink (induced by the trigger frame), by a method by which also a different base station or a wireless terminal connected to a different base station can receive the frame simultaneously together with a subordinate wireless terminal of the base station. Since this makes it possible for the base station to notify also the different base station of information relating to a transmission schedule of a trigger frame together with a subordinate wireless terminal of the base station, consumption of a communication resource by additional frame transmission can be suppressed.

Further, when the wireless terminal receives a frame including information relating to a transmission schedule of a trigger frame from a different base station that is not a connection destination of the wireless terminal itself, the wireless terminal may relay the substance of the frame to the base station of the connection destination of the wireless terminal itself as occasion demands. This makes it possible for the base stations to share, even in such an environment that communication between the base stations cannot be performed, information relating to a transmission schedule of a trigger frame therebetween.

Then, if the base station receives information relating to a transmission schedule of a trigger frame of a different base station, then if it determines a schedule of a trigger frame of the base station itself such that collision of frames or transmission of a trigger frame outside a schedule is prevented, then multi-user communication of an uplink can be carried out efficiently.

It is to be noted that, from a point of view that multi-user communication of an uplink is carried out in accordance with a schedule designated by a trigger frame, it can be regarded as an example of "scheduled communication" that a plurality of wireless terminals subordinate of a base station perform multi-user communication of an uplink by induction by a trigger frame transmitted from the base station.

Further, the "information relating to scheduled communication" includes a transmission schedule of a trigger frame that induces "scheduled information" (namely, multi-user communication of an uplink). The "information relating to scheduled information" can further include information relating to a resource, a transmission method of a trigger frame and so forth to be used in transmission of a trigger frame and information relating to multi-user communication induced by the trigger frame. The "information relating to multi-user communication" here includes information, for example, relating to a resource, a transmission permission terminal, a transmission permission traffic and a communication parameter to be used by multi-user communication. In the following description, the "information related to scheduled information" is referred to also as "schedule information."

Further, the present specification additionally proposes also a technology for sharing information by which a MAC (Media Access Control) address and an AID (Association Identifier) relating to a subordinate wireless terminal are associated with each other in advance between base stations.

Here, the MAC address is a unique identifier among all terminals, and the AID is a unique identifier for each BSS. Usually, the MAC address has an information amount of 48 bits, and the AID has an information amount of 11 bits indicated by a number within 1 to 2007. In the trigger frame, transmission permission terminal information is indicated using an AID (hereinafter described).

By sharing mapping information, which associates MAC addresses and AIDs of wireless terminals subordinate of base stations with each other, between the base stations, information of transmission permission terminals included in schedule information can be indicated by the AIDs. This is because each base station can acquire, on the basis of the mapping information, a MAC address associated with the AID of a wireless terminal that is not connected to the own station and can decide which wireless terminal is to perform multi-user communication of an uplink. By indicating transmission permission terminal information using the AID in the schedule information, the data amount can be reduced from that in a case where the MAC address is used.

FIG. 1 depicts an example of a configuration of a wireless communication system 100 to which it is supposed to apply the technology disclosed in the present specification. The wireless communication system 100 depicted includes a BSS 1 configured from a base station (Access Point) AP1 and a BSS 2 configured from a base station AP2. To AP1, subordinate wireless terminals (Stations) STA1*a* and STA1*b* are connected. Meanwhile, to AP2, subordinate wireless terminals STA2*a* and STA2*b* are connected.

In the following, two working examples are described with reference to FIG. 1. However, in the working example 1, it is assumed that AP1 and AP2 are positioned such that a signal can be received from each other. Meanwhile, in the working example 2, it is assumed that AP1 and AP2 are positioned such that a signal cannot be received from each other and besides STA1*a* is positioned such that it can receive a signal of AP2 while STA2*b* is positioned such that it can receive a signal of AP1.

Figure 2:
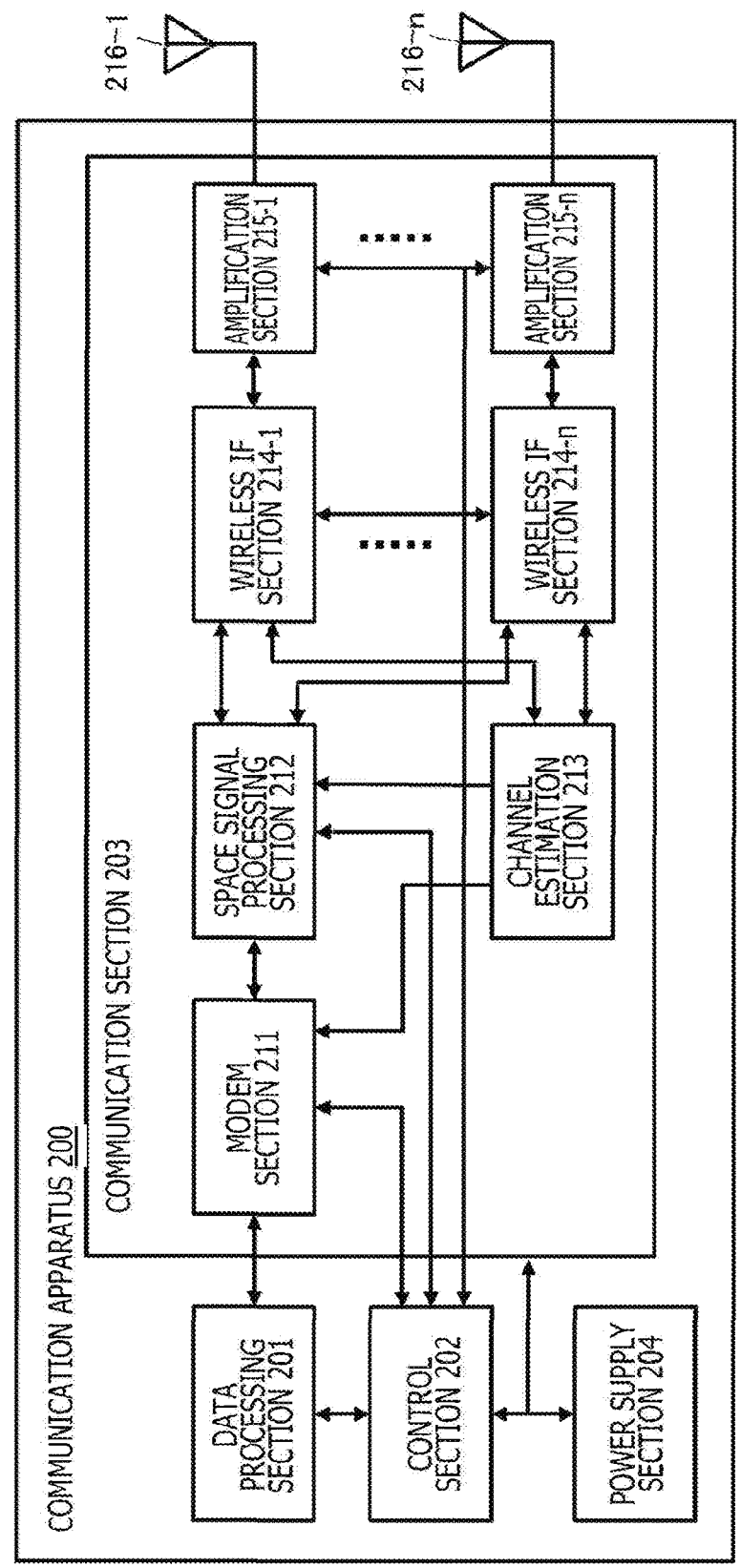
FIG. 2 is a view depicting an example of a configuration of a communication apparatus 200.

FIG. 2 depicts an example of a functional configuration of a communication apparatus 200 that performs, in the working examples, communication operation as a base station or a wireless terminal in such a wireless communication system 100 as depicted in FIG. 1 (in other words, includes a plurality of BSSs neighboring with each other). It should be recognized that a basic configuration is similar not only in the base stations but also in the wireless terminals.

The communication apparatus 200 is configured from a data processing section 201, a control section 202, a communication section 203 and a power supply section 204. Further, the communication section 201 includes modem section 211, a space signal processing section 212, a channel estimation section 213, a wireless interface (IF) section 214, an amplification section 215 and an antenna 216. However, the wireless interface section 214, amplification section 215 and antenna 216 may form one set and configure one transmission/reception branch and the communication section 201 may be configured from two or more such transmission/reception branches. Further, the amplification section 215 has a function that is sometimes included in the wireless interface section 214. Further, the antenna 216 is sometimes provided in the communication section 203 (or in the communication apparatus 200) or is sometimes attached to the outside the communication apparatus 200.

The data processing section 201 generates, upon transmission when data is inputted from a protocol upper layer (not depicted), a packet for wireless transmission from the data, executes such processes as addition of a header for MAC control and addition of an error detection code and provides data after the processes to the modem section 211. On the other hand, upon reception when an input from the modem section 211 is received, the data processing section 201 carries out analysis of the MAC header, detection of a packet error, a re-order process and so forth and provides data after the processes to a protocol upper layer of the data processing section 201 itself.

The control section 202 performs delivery of information between the components in the communication apparatus 200. Further, the control section 202 performs parameter setting in the modem section 211 and the space signal processing section 212 and scheduling of a packet in the data processing section 201. Furthermore, the control section 202 performs parameter setting and transmission power control of the wireless interface section 214 and the amplification section 215.

Further, the control section 202 in a case where the communication apparatus 200 operates as a base station controls the components so as to transmit a trigger frame in order to control operation of multi-user communication of an upper link of the subordinate wireless terminals. On the other hand, the control section 202 in a case where the communication apparatus 200 operates as a wireless terminal controls the components so as to carry out multi-user communication of an upper link together with a different wireless terminal in the same BSS in accordance with information described in the received trigger frame.

Especially, in the present embodiment, the control section 202 controls the components such that it can effectively share information relating to multi-user communication of an uplink with the different base station.

In particular, the control section 202 in a case where the communication apparatus 200 operates as a base station determines schedule information relating to multi-user communication of an uplink to be carried out in the BSS of the communication apparatus 200 itself and controls the components such that a frame in which the schedule information is placed is transmitted by a method by which the frame can be received simultaneously by the subordinate wireless terminals and also by the wireless terminals of the different BSS simultaneously. For example, into a frame into which schedule information is placed, a designation address is placed which can be received by the wireless terminals subordinate of the own station, the different base station and the wireless terminals subordinate of the different base station. The frame in which the schedule information is descried may be transmitted as an independent frame or may be transmitted simultaneously with a beacon frame or as part of the beacon frame.

On the other hand, the control section 202 in a case where the communication apparatus 200 operates as a base station controls the components so as to receive schedule information from the different base station. For example, the communication apparatus 200 that operates as a base station receives, after it transmits schedule information of the communication apparatus 200 itself to its subordinate wireless terminals, schedule information from the different base station (by which the schedule information is received). As an alternative, the communication apparatus 200 that operates as a base station first issues a request for transmission (relay) of schedule information of the different base station to the subordinate wireless terminals of the communication apparatus 200 and then receives schedule information of the different base station from the subordinate wireless terminals of the communication apparatus 200.

Then, the control section 202 determines schedule information of the communication apparatus 200 itself (namely, a schedule for transmitting a trigger frame from the communication apparatus 200 itself, and a resource, a transmission permission terminal, a transmission permission traffic, other communication parameters and so forth to be used in multi-user communication of an uplink) taking also the schedule information of the different base station (namely, a schedule in accordance with which multi-user communication of an uplink is carried out by the wireless terminals connected to the different base station).

On the other hand, the control section 202 in a case where the communication apparatus 200 operates as a wireless terminal waits for reception of a trigger frame from the base station of the connection designation of the communication apparatus 200 itself or transits to a Power Save Mode in response to a transmission timing of a trigger frame on the basis of the schedule information received from the base station of the connection destination of the communication apparatus 200 itself. Further, the control section 202 in a case where the communication apparatus 200 operates as a wireless terminal performs a reception process of a frame including schedule information from the different base station that is not the connection terminal of the communication apparatus 200 itself and controls the components so as to relay the substance of the frame to the base station of the connection destination as occasion demands (for example, when a request is received from the base station of the connection destination).

Further, in the present embodiment, the control section 202 in a case where the communication apparatus 200 operates as a base station controls the components so as to share mapping information that associates MAC addresses and AIDs relating to the subordinate wireless terminals with each other with the different base station. For example, the control section 202 controls the components such that a frame including mapping information can be exchanged between the base stations. By sharing information that associates the MAC addresses and the AIDs of the subordinate wireless terminals of the base stations between the base stations, information of transmission permission terminals to be included in schedule information can be indicated by their AIDs, and as a result, the data amount of the schedule information amount can be reduced (described hereinabove).

The modem section 211 performs, upon transmission, encode, interleave and modulation processes on the basis of coding and modulation methods set by the control section 202 for input data from the data processing section 201 to generate a data symbol stream and provides the data symbol stream to the space signal processing section 212. On the other hand, upon reception, the modem section 211 performs processes reverse to those upon transmission, namely, demodulation, deinterleave and decode processes, for an input from the space signal processing section 212 on the basis of the coding and modulation methods set by the control section 201 and provides data to the data processing section 201 and the control section 202.

The space signal processing section 212 performs, upon transmission, signal processing provided for space separation for an input from the modem section 211 as occasion demands and provides resulting one or more transmission symbol streams to the respective wireless interface sections 214. On the other hand, upon reception, the space signal processing section 212 performs signal processing for reception symbol streams inputted respectively from the wireless interface sections 214, performs space separation of the streams as occasion demands and provides results of the space separation to the modem section 211.

The channel estimation section 213 calculates complex channel gain information of the propagation path from the preamble part and the training signal part of the input signals from the wireless interface sections 214. Then, the calculated complex channel gain information is utilized for a demodulation process by the modem section 211 and a space process by the space signal processing section 212 through the control section 202.

The wireless interface section 214 converts, upon transmission, an input from the space signal processing section 212 into an analog signal, carries out filtering and up conversion to a carrier frequency and sends out a result of the up conversion to the antenna 216 or the amplification section 215. On the other hand, upon reception, the wireless interface section 214 carries out processes reverse to those upon transmission such as down conversion and conversion into a digital signal for an input from the antenna 216 or the amplification section 215 (reception signal of the carrier frequency) and provides resulting data to the space signal processing section 212 and the channel estimation section 213.

The amplification section 215 amplifies, upon transmission, an analog signal inputted from the wireless interface section 214 to predetermined power and sends out the amplified analog signal to the antenna 216. On the other hand, upon reception, the amplification section 215 performs low noise amplification of a reception signal inputted from the antenna 216 to predetermined power and then outputs the resulting signal to the wireless interface section 214. At least one of the function upon transmission or the function upon reception of the amplification section 215 is sometimes included in the wireless interface section 214.

The power supply section 204 is configured from a fixed power supply such as a battery power supply or a commercial power supply and supplies driving power to the components in the communication apparatus 200.

It is to be noted that, although the communication apparatus 200 can further include a function module in addition to those depicted in FIG. 2, since this does not have a direct relation to the technology disclosed in the present specification, illustration and description of the same are omitted.

In the following, working examples (1) and (2) of the wireless communication system 100 to which the technology disclosed in the present specification is applied are described.

(1) In a situation in which base stations can receive a signal from each other, any base station transmits a frame, which includes schedule information relating to multi-user communication of an uplink (a transmission schedule of a trigger frame or the like), by a method by which wireless terminals subordinate of the base station and wireless terminals of a different BSS can receive the frame.

(2) In a situation in which base stations cannot receive a signal from each other, a frame including schedule information relating to multi-user communication of an uplink is relayed to a wireless terminal of a different BSS by a subordinate wireless terminal.

Working Example 1

In the working example 1, in a situation in which base stations can receive a signal from each other, a frame including schedule information relating to multi-user communication of an uplink is transmitted by a method by which the frame can be received by a subordinate wireless terminal and a wireless terminal of a different BSS.

Figure 11:
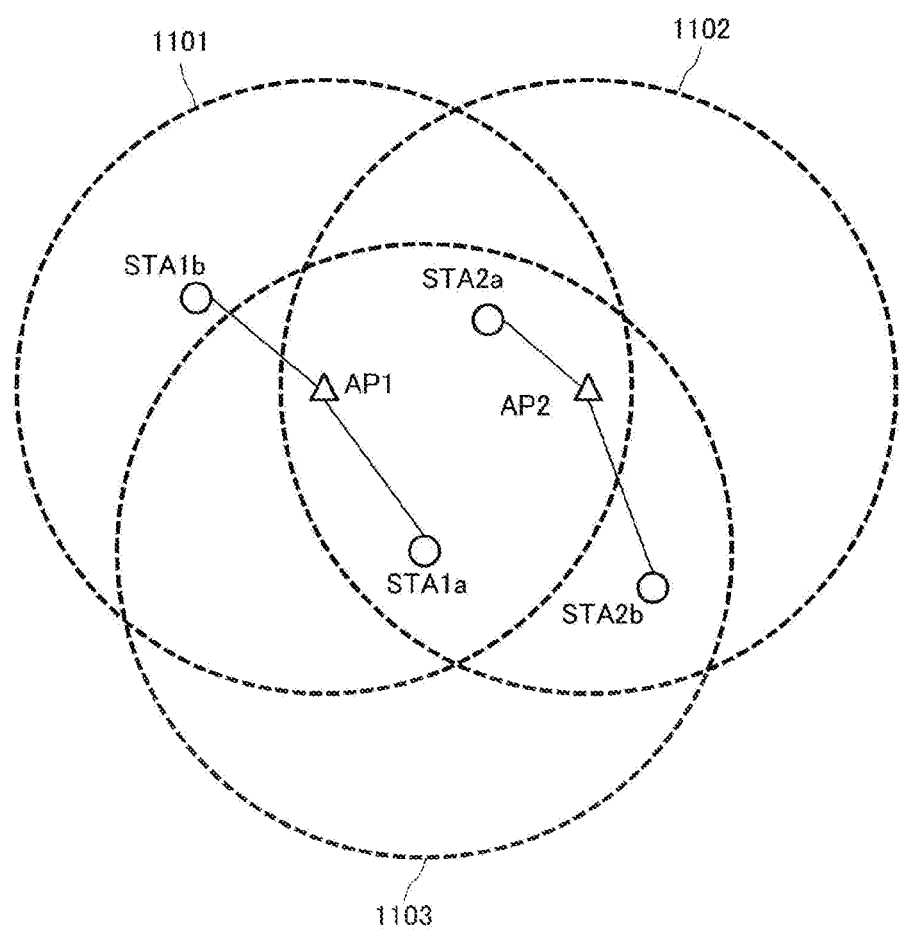
FIG. 11 is a view exemplifying a network topology assumed in the working example 1.

FIG. 11 exemplifies a network topology supposed in the working example 1. AP2 exists in a signal coverage 1102 of AP2 and also AP1 exists in the signal coverage 1102 of AP2, and AP1 and AP2 can directly receive a transmission frame from each other. It is to be noted that AP1 and AP2 exist also in a signal coverage 1103 of STA1*a*.

Figure 3:
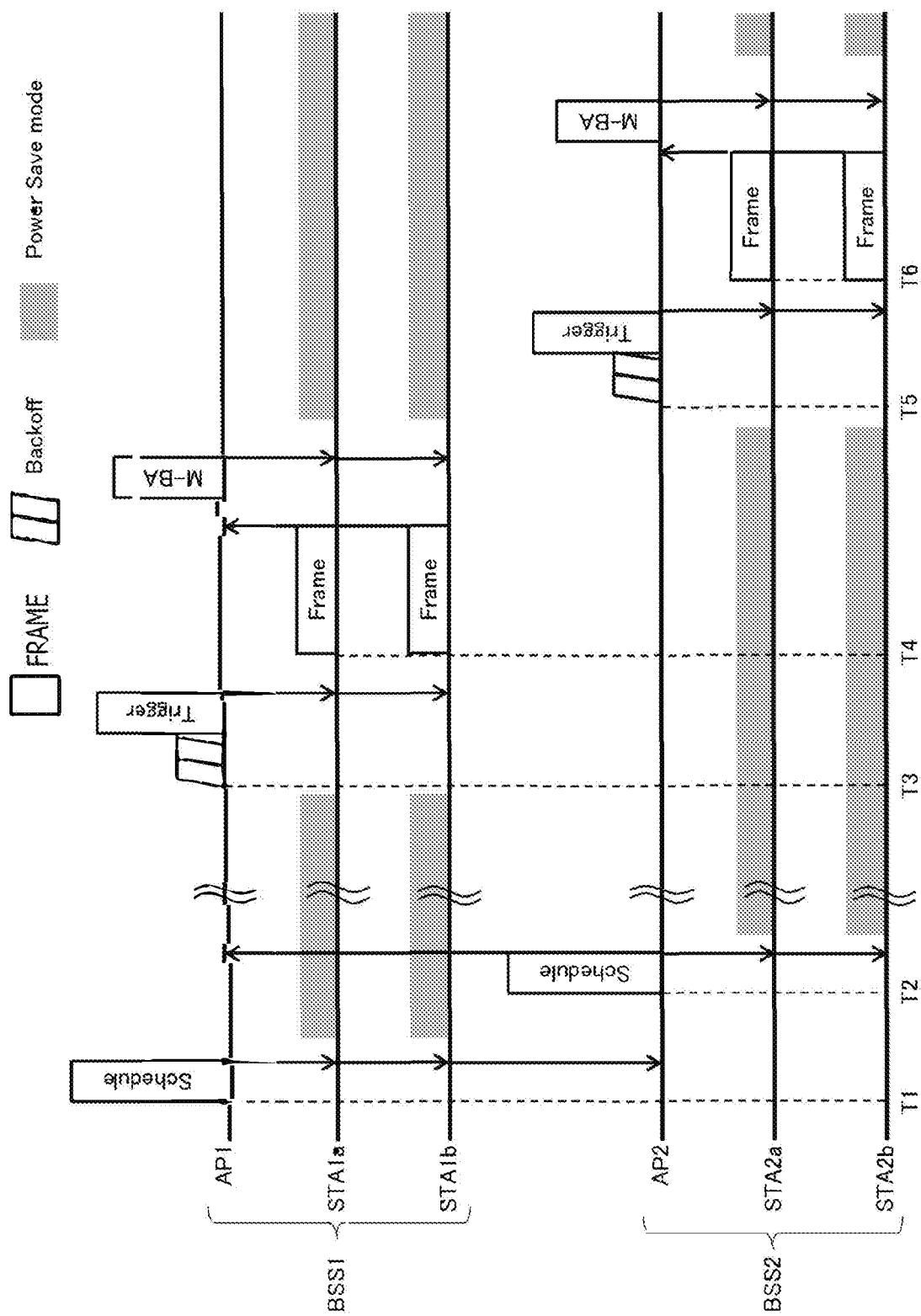
FIG. 3 is a view depicting an example of a communication sequence (working example 1) supposed in the wireless network configuration depicted in FIG. 1.

FIG. 3 depicts an example of a communication sequence supposed in the wireless network configuration depicted in FIG. 1. It is to be noted that the axis of abscissa of FIG. 1 is a time axis, and a blank rectangle on each axis indicates a frame transmitted from the applicable communication apparatus at time corresponding to a position on the axis of abscissa and the point of an arrow mark of a solid line extending in a vertical direction from a frame is a transmission destination (arriving destination) of the frame. Further, a parallelogram on each axis indicates random waiting time (Backoff) by a collision avoidance mechanism of the applicable communication apparatus. Further, a grey rectangle on each axis indicates that the applicable communication apparatus is in a state in which it temporarily suspends its function in a BSS to which it belongs for a period indicated by the rectangle (Power Save Mode).

Before the sequence of communication depicted in FIG. 3 is started, AP1 and AP2 may individually carry out, with subordinate wireless terminals STA1*a* and STA1*b* and subordinate wireless terminals STA2*a* and STA2*b*, respectively, a confirmation sequence for confirming whether or not each subordinate wireless terminal is ready for reception of a frame including information relating to scheduled communication. Further, the confirmation sequence may be carried not between each of the APs and each subordinate STA but between AP1 and AP2.

AP1 determines to cause its own subordinate wireless terminals STA1*a* and STA1*b* to use multi-user communication of an uplink for transmission and determines schedule information including information relating to a transmission schedule of a trigger frame for inducing such transmission. AP1 may determine, as schedule information, in addition to a transmission schedule of a trigger frame, information relating to a transmission method of a transmission frame such as a transmission frequency, transmission power, a modulating encoding method or a permissible interference level to be used for transmission of the trigger frame. Further, AP1 may additionally determine information relating to multi-user communication of an uplink to be induced by a trigger frame (a resource, transmission permission terminals, a transmission permission traffic, other communication parameters and so forth to be used in multi-user communication of an uplink) and include the information into the schedule information.

Then, AP1 transmits schedule information determined by itself in a frame that can be received not only by the subordinate wireless terminals STA1*a* and STA1*b* but also by the different base station AP2. This transmission frame may include an address of the transmission source and destination addresses indicating that the transmission frame is destined not only for the subordinate wireless terminals STA1*a* and STA1*b* but also for the different base station AP2.

AP1 may transmit a transmission frame including schedule information simultaneously with a beacon frame or may transmit the transmission frame as part of the beacon frame.

The beacon frame in the latter case may include a flag indicating that it includes schedule information.

As an alternative, a new frame "Schedule" intended for transmission of schedule information may be provided. In FIG. 3, for the convenience of description, schedule information is transmitted using the newly provided Schedule frame. In this case, AP1 may form the Schedule frame itself so as to include a destination address capable of being received by the different base station AP2 together with the subordinate wireless terminals STA1a and STA1b such that the Schedule frame includes only a transmission source address as the address information.

In a case where the Schedule frame is newly provided, AP1 may transmit the Schedule frame at various timings. AP1 may transmit the Schedule frame utilizing a transmission interval allocated thereto in advance or may transmit the Schedule frame by random accessing. In the latter case, AP1 first sets random waiting time (Backoff) by the collision avoidance mechanism and then transmits the Schedule frame (in FIG. 3, such Backoff is not depicted).

Also, AP1 may transmit a Schedule frame in response to reception of a request frame for requesting schedule information from the different base station AP2 (in FIG. 3, such a request frame is not depicted).

As an alternative, AP1 may receive a Schedule frame from AP2 after it transmits a Schedule frame to the wireless terminals STA1a and STA1b connected to AP1 itself. Conversely speaking, AP2 also may transmit a Schedule frame from AP2 itself in response to reception of a Schedule frame from the different base station AP1.

Further, whichever one of the forms described above is used by AP1 to transmit schedule information, the schedule information may further include information relating to a transmission schedule or a transmission method of a trigger frame and information relating to multi-user communication of an uplink (a transmission frequency, transmission power, a modulation encoding method, a permissible interference level, transmission permission terminal information, transmission permission traffic information, communication parameters and so forth in multi-user communication of an uplink).

On the other hand, if AP2 receives schedule information from the neighboring base station AP1, then it determines schedule information relating to multi-user communication of an uplink in the BSS 2 on the basis of the schedule information of AP1 and different information AP2 itself has. The different information AP2 itself has may be, for example, an attribute, a buffer state, a communication resource state, a previous communication result and so forth of its subordinate wireless terminals STA2a and STA2b. Further, the schedule information determined by AP2 may include a transmission schedule of a trigger frame for causing transmission by multi-user communication of an uplink to be induced in the subordinate wireless terminals STA2a and STA2b, information relating to a transmission frequency, transmission power, a modulation encoding method, a permissible interference level and so forth to be used for transmission of the trigger frame and information relating to a resource, transmission permission terminals, transmission permission traffic and other communication parameters to be used in multi-user communication of an uplink induced by the trigger frame. Then, AP2 transmits schedule information in a frame that can be received by the different base station AP1 together with its subordinate wireless terminals STA2a and STA2b by a method similar to that of AP1 (described hereinabove).

Then, AP1 and AP2 transmit, on the basis of the transmission schedules determined by them themselves, a trigger frame to their subordinate wireless terminals STA1a and STA1b, and STA2a and STA2b so as to induce a series of multi-user communications of an uplink in each BSS.

Each of the wireless terminals STA1a and STA1b, and STA2a and STA2b may set, on the basis of schedule information received from the base station AP1 or AP2 of the connection destination of the wireless terminal itself, a period within which operation for the base station AP1 or AP2 is to be temporarily suspended during a period (Power Save Mode) until a transmission timing of a trigger frame arrives from the base station of the connection destination. The wireless terminal may transit to a power saving state during a period for the temporary suspension or may perform communication with the different base station connected thereto utilizing the period or else may search for a different base station to be connected.

Referring to FIG. 3, if AP1 determines schedule information relating to multi-user communication of an uplink in the BSS of API itself, then it transmits a Schedule frame in which the schedule information determined by AP1 itself is placed at time T1. The schedule information includes information relating to a schedule or a transmission method of AP1 for transmitting a trigger frame to its subordinate wireless terminals STA1a and STA1b and a resource, a transmission permission terminal, a transmission permission traffic, other communication parameters and so forth to be used in multi-user communication of an uplink by STA1a and STA1b. This Schedule frame is received by the different base station AP2 together with the subordinate wireless terminals STA1a and STA1b of AP1. The Schedule frame may be transmitted simultaneously with a beacon frame or may be part of the beacon frame. The beacon frame in the latter case may include a flag indicating that it includes schedule information.

If the wireless terminals STA1a and STA1b grasp a transmission schedule of a trigger frame of AP1 on the basis of the schedule information received from AP1, then they temporarily suspend during a period till time T3 that is a transmission timing of a next trigger frame from AP1.

Meanwhile, the base station AP2 determines, on the basis of the schedule information received from AP1 and other information AP2 itself has, schedule information of the base station AP2 itself such as a schedule of the own station for transmitting a trigger frame to its subordinate wireless terminals STA2a and STA2b, and a resource, a transmission permission terminal, a transmission permission traffic, other communication parameters and so forth to be used in multi-user communication of an uplink by STA2a and STA2b. The other information AP2 itself has may be, for example, an attribute, a buffer state, a communication resource state, a previous communication result and so forth of the subordinate wireless terminals STA2a and STA2b of AP2.

Then, at time T2, AP2 transmits a Schedule frame in which the schedule information determined by AP2 itself is placed. This Schedule frame is received by the different base station AP1 together with the subordinate wireless terminals STA2a and STA2b of AP2. The Schedule frame is transmitted simultaneously with a beacon frame or may be part of the beacon frame. The beacon frame in the latter case may include a flag indicating that it includes schedule information.

AP1 receives the schedule information of AP2 after it transmits the Schedule frame that includes the schedule information of AP1 itself from the own station to its subordinate wireless terminals. Stated another way, AP2 transmits schedule information to the subordinate wireless terminals of AP2 itself after it receives schedule information from the different base station AP1.

If the wireless terminals STA2*a* and STA2*b* grasp the transmission schedule of a trigger frame of AP2 on the basis of the schedule information received from AP2, then they temporarily suspend during a period till time T5 that is a transmission timing of a next trigger frame from AP2.

Further, AP1 can determine, on the basis of the schedule information received from the different base station AP2 and other information AP1 itself has, schedule information of AP1 itself such as a schedule for transmitting a trigger frame to its subordinate wireless terminals STA1*a* and STA1*b* after this and a resource, transmission permission terminals, a transmission permission traffic, other communication parameters and so forth to be used in multi-user communication of an uplink by STA1*a* and STA1*b*. The other information AP1 itself has may be, for example, an attribute, a buffer state, a communication resource state, a previous communication result and so forth of its subordinate wireless terminals STA1*a* and STA1*b*.

In the BSS 1, when time T3 that is a transmission timing of a trigger frame designated by the Schedule frame transmitted at time T1 comes, AP1 first sets random waiting time (Backoff) by the collision avoidance mechanism and then transmits a trigger frame "Trigger." This trigger frame includes information for giving permission of transmission to the wireless terminals STA1*a* and STA1*b*.

In a case where STA1*a* and STA1*b* temporarily suspend, when a transmission timing of a trigger frame from AP1 approaches, they restore ordinary operation and receive the trigger frame from AP1. Then, STA1*a* and STA1*b* simultaneously transmit a frame "Frame" to AP1 at time T4 designated by the trigger frame to carry out multi-user communication of an uplink. When AP1 receives the frames from the wireless terminals STA1*a* and STA1*b*, it returns a confirmation response frame "M-BA (Multi-STA Block-Ack."

Also in the BSS 2, when time T5 that is a transmission timing of a trigger frame designated by the Schedule frame transmitted at time T2 from AP2 comes, AP2 first sets random waiting time (Backoff) by the collision avoidance mechanism and then transmits a trigger frame "Trigger." This trigger frame includes information for giving permission of transmission to the wireless terminals STA2*a* and STA2*b*.

In a case where STA2*a* and STA2*b* temporarily suspend, when a transmission timing of a trigger frame from AP2 approaches, they restore ordinary operation and receive the trigger frame from AP2. Then, STA2*a* and STA2*b* simultaneously transmit a frame "Frame" to AP2 at time T6 designated by the trigger frame to carry out multi-user communication of an uplink. In response to this, a confirmation response frame "M-BA" is transmitted back from AP2.

Thereafter, in each BSS, transmission of a Schedule frame and a trigger frame from a base station and multi-user communication of an uplink by subordinate wireless terminals are carried out repetitively by a communication sequence similar to that described above.

Figure 4:
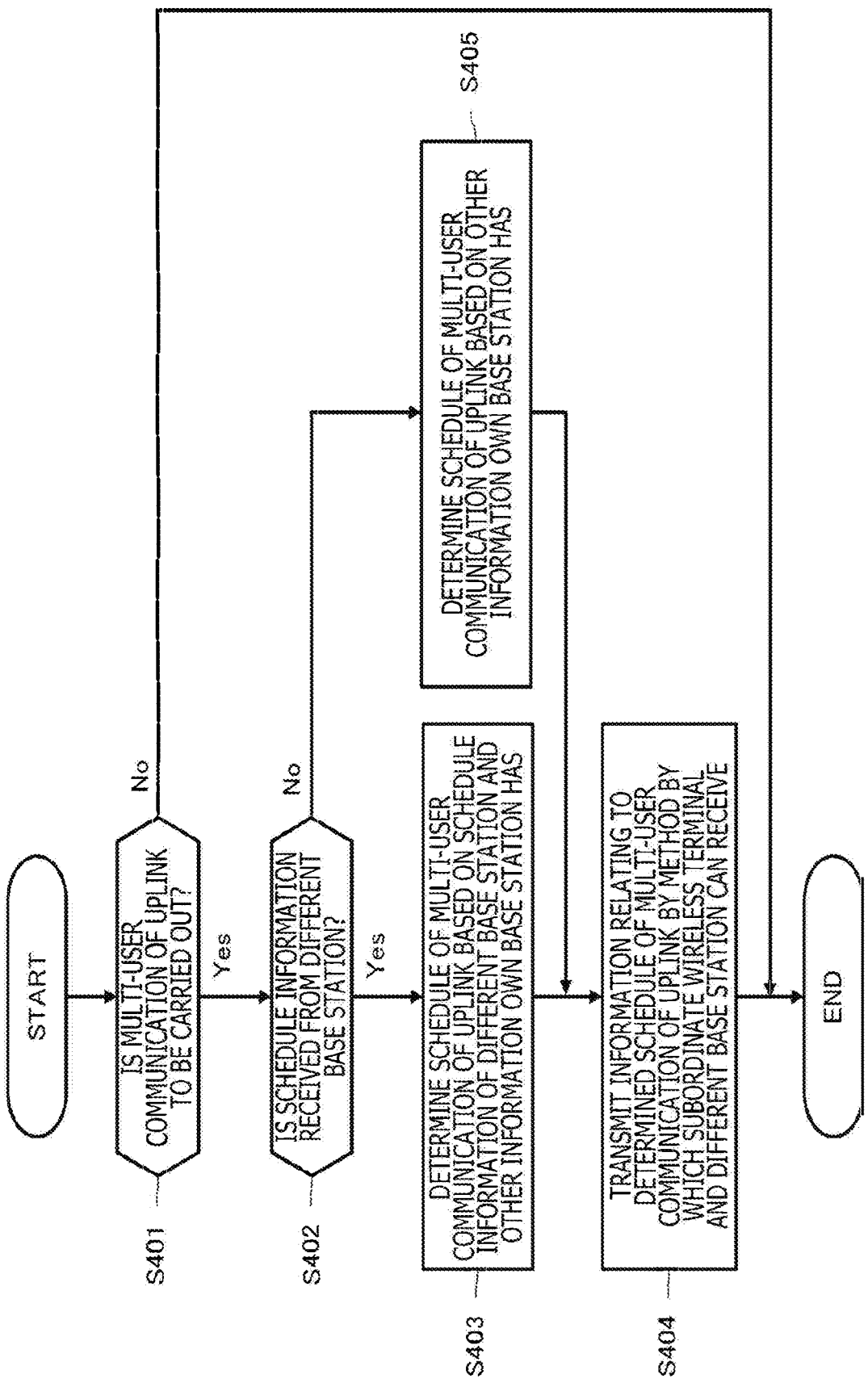
FIG. 4 is a flow chart (working example 1) depicting a processing procedure for allowing a base station to perform communication operation.

FIG. 4 depicts a processing procedure for allowing a base station in the present working example to perform communication operation in the form of a flow chart. This processing procedure is carried out principally by, for example, the control section 202 of the communication apparatus 200 (that operates as a base station) depicted in FIG. 2.

In a case where the base station is to carry out multi-user communication of an uplink in a BSS of the base station itself (Yes at step S401), it checks whether or not a Schedule frame is successfully received from a different base station (step S402). On the other hand, in a case where the base station is not to carry out multi-user communication of an uplink (No at step S401), it ends the present processing skipping all succeeding processes.

Then, in a case where a Schedule frame is successfully received from a different base station (Yes at step S402), the base station determines, on the basis of schedule information of the different base station and other information the base station itself has, schedule information for carrying out multi-user communication of an uplink in the BSS of the base station itself (step S403).

On the other hand, in a case where a Schedule frame is not successfully received from the different base station (No at step S402), the base station determines schedule information for carrying out multi-user communication of an uplink in the BSS of the base station itself on the basis of the other information the base station itself has (step S405).

At steps S403 and S405, the base station determines, as the schedule information, a schedule for transmitting a trigger frame to its subordinate wireless terminals, and information relating to a transmission frequency, transmission power, a modulation encoding method, a permissible interference level and so forth to be used for transmission of the trigger frame, and information of a resource, a transmission permission terminal, a transmission permission traffic, other communication parameters and so forth to be used in multi-user communication of an uplink to be induced by the trigger frame.

Then, the base station transmits the schedule information determined at step S403 or S405 by a method by which the schedule information can be received also by the different base station simultaneously with its subordinate wireless terminals (step S404) and then ends the present processing.

At step S404, the base station transmits a frame in which the schedule information is placed and which includes destination addresses that can be received, for example, by its subordinate wireless terminals, the different base station and the wireless terminals connected to the different base station. Further, the base station transmits a Schedule frame including the schedule information simultaneously with a beacon frame, or the schedule information may be transmitted as part of the beacon frame. The beacon frame in the latter case may include a flag indicating that it includes schedule information.

After the base station carries out the communication operation by such a processing procedure as depicted in FIG. 4, it transmits a trigger frame in accordance with the determined schedule information. Further, each of the subordinate wireless terminals of the base station receives a trigger frame from the base station in accordance with the received schedule information and besides wireless terminals between which transmission is permitted by the trigger frame carry out multi-user communication of an uplink to the base station (refer to FIG. 3).

Figure 5:
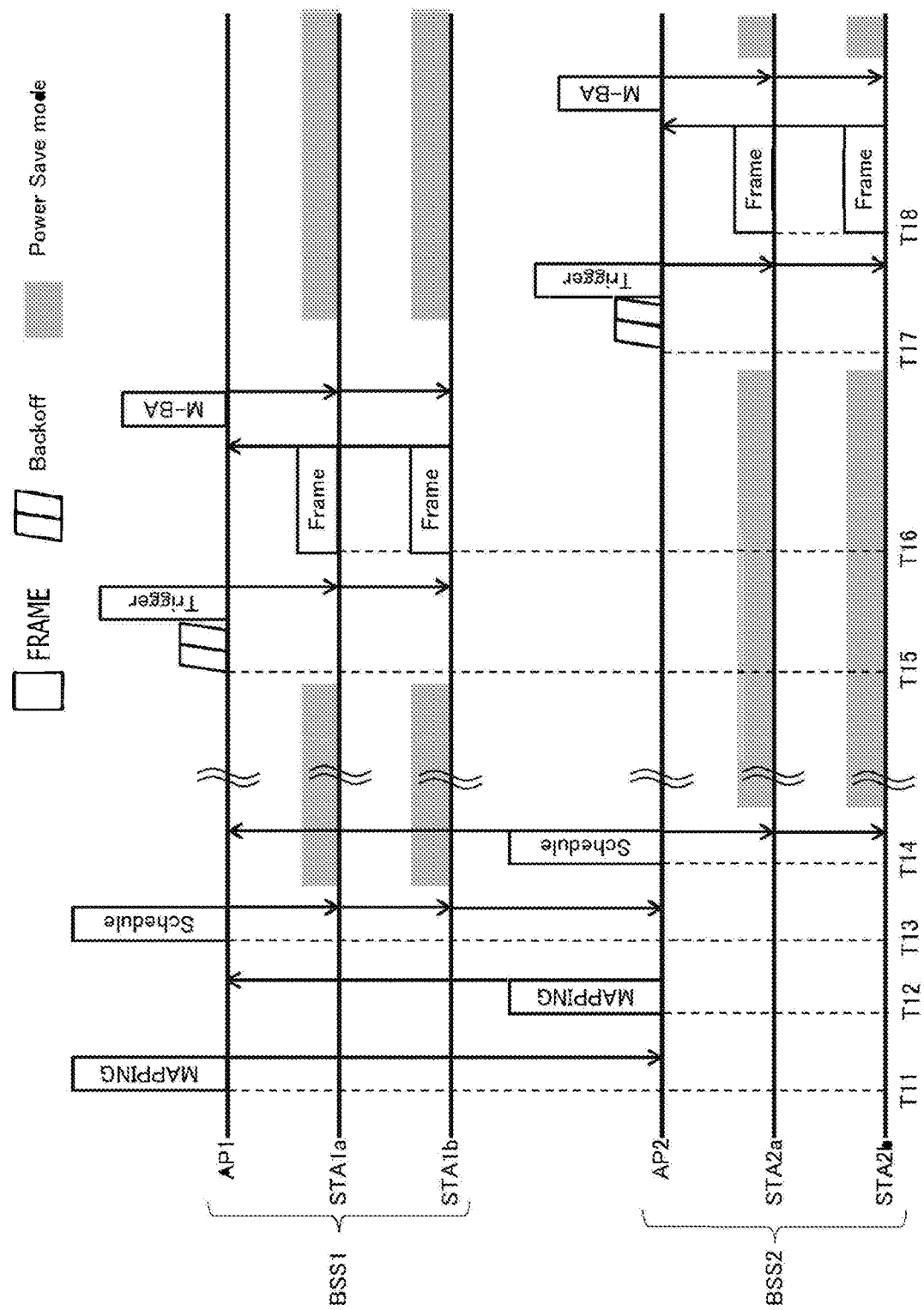
FIG. 5 is a view depicting a modification of the communication sequence depicted n FIG. 3.

FIG. 5 depicts a modification of the communication sequence depicted in FIG. 3. It is to be noted that this is a communication sequence that presupposes that it is carried out by the wireless network configuration depicted in FIG. 1. Further, in FIG. 5, the axis of abscissa is a time axis, and the describing method of a frame on each axis, waiting time, a temporarily suspended state and so forth is similar to that of the example of the communication sequence depicted in FIG. 3.

Before the communication sequence depicted in FIG. 5 is started, AP1 and AP2 may carry out a confirmation sequence for confirming whether or not their subordinate wireless terminals STA1a and STA1b, and STA2a and STA2b are ready for reception of a frame including information relating to scheduled communication, respectively. Further, this confirmation sequence may be carried out not between each AP and each subordinate STA but between AP1 and AP2.

In the communication sequence depicted in FIG. 5, each base station AP transmits, after it shares information for associating a plurality of kinds of identifiers of each subordinate wireless terminal STA with the different base station, a Schedule frame including schedule information relating to multi-user communication of an uplink by a method by which the subordinates and wireless terminals of the other BSS can receive the Schedule frame simultaneously.

AP1 transmits mapping information that can associate identifiers of the subordinate wireless terminals STA1a and STA1b connected to AP1 itself, which are unique among all terminals, and restrictive identifiers that are effective only in the connected state thereto of the wireless terminals STA1a and STA1b to AP2. The identifiers common among all terminals here may be MAC addresses. Further, the restrictive identifiers that are effective only in the connected state may be identifier AIDs each of which is unique to each BSS. Normally, while a MAC address has an information amount of 48 bits, an AID has an information amount of 11 bits indicated by a number from 1 to 2007 and is smaller in data size than the MAC address. AP1 may update the mapping information every time a new STA is connected to the BSS of AP1 itself and transmit the mapping information to AP2. Also, AP2 transmits information of identifiers unique to and restrictive identifiers of the wireless terminals STA2a and STA2b connected to AP2 itself to AP1. It is to be noted that AP1 and AP2 may update mapping information every time a new STA is connected to the BSS of any of AP1 and AP2 itself and transmit the updated mapping information to each other.

Referring to FIG. 5, at time T11, AP1 transmits, to AP2, a frame "MAPPING" including s mapping information that associates identifiers of the subordinate wireless terminals STA1a and STA1b connected to AP1 itself, which are unique among all terminals, and restrictive identifiers that are effective only in the connected state thereto of the wireless terminals STA1a and STA1b. Further, at time T12, AP2 transmits, to AP1, a frame "MAPPING" including mapping information that can associate identifiers of the subordinate wireless terminals STA2a and STA2b connected to AP2 itself, which are unique among all terminals, and restrictive identifiers that are effective only in the connected state thereto of the wireless terminals STA2a and STA2b. This makes it possible for AP1 and AP2 to share therebetween information that associates the MAC addresses and the AIDs of the wireless terminals subordinate of them. As a result, AP1 can discriminate each MAC address from the AIDs of the wireless terminals STA2a and STA2b connected to the different base station AP2. Similarly, AP2 can discriminate each MAC address from the AIDs of the wireless terminals STA1a and STA1b connected to the different base station AP1.

Thereafter, if AP1 determines, on the basis of the information AP1 itself has, schedule information relating to multi-user communication of an uplink in the BSS 1 of AP1 itself, then it transmits the schedule information as a Schedule frame in which the schedule information determined by AP1 itself at time T13 is placed as a Schedule frame. This Schedule frame is received by the different base station AP2 together with the subordinate wireless terminals STA1a and STA1b. The Schedule frame is transmitted simultaneously with a beacon frame or may be part of the beacon frame. In the beacon frame in the latter case, a flag indicating that it includes schedule information may be included.

The schedule information transmitted by the Schedule frame includes information relating to a schedule for transmission and a transmission method of a trigger frame to the subordinate wireless terminals STA1a and STA1b of AP1 from AP1 and a resource, a transmission permission terminal, a transmission permission traffic, other communication parameters and so forth to be used in multi-user communication of an uplink by STA1a and STA1b. Here, the transmission permission terminal can be indicated using an AID, and the data amount of schedule information can be reduced from that in a case where a MAC address is used.

If the wireless terminals STA1a and STA1b grasp the transmission schedule of the trigger frame of AP1 on the basis of the schedule information received from AP1, then they temporarily suspends during a period till time T15 that is a transmission timing of a next trigger frame.

Meanwhile, the base station AP2 determines schedule information of the base station AP2 itself on the basis of the schedule information received from AP1 and other information AP2 itself has. The other information AP2 itself has may be, for example, an attribute, a buffer state, a communication resource state, a previous communication result and so forth of the subordinate wireless terminals STA2a and STA2b of AP2. Although the schedule information received from AP1 indicates a transmission permission terminal using an AID, AP2 can decide the MAC address of the transmission permission terminal on the basis of the mapping information shared in prior with AP1 and acquire the information of multi-user communication of an uplink on AP1 side. Further, although AP2 determines a schedule for transmitting a trigger frame to the subordinate wireless terminals STA2a and STA2b from AP2 itself as schedule information, a resource, a transmission permission terminal, a transmission permission traffic, other communication parameters and so forth to be used in multi-user communication of an uplink by STA2a and STA2b, it indicates the transmission permission terminal using its AID (same as above).

Then, AP2 transmits the schedule information determined by AP2 itself as a Schedule frame at time T14. This Schedule frame is received by the different base station AP1 together with the subordinate wireless terminals STA2a and STA2b. The Schedule frame may be transmitted simultaneously with a beacon frame or may be part of the beacon frame. The beacon frame in the latter case may include a flag indicating that it includes schedule information.

When the wireless terminals STA2a and STA2b grasp the transmission schedule of a trigger frame of AP2 on the basis of the schedule information received from AP2, it temporarily suspends during a period till time T17 that is a transmission timing of a next trigger frame.

Further, the base station AP1 determines schedule information of the base station AP1 itself on the basis of the schedule information received from AP2 and other information AP1 itself has. The other information AP1 itself has may be, for example, an attribute, a buffer state, a communication resource state, a previous communication result and so forth of its subordinate wireless terminals STA1a and STA1b. Although, in the schedule information received from AP2, a transmission permission terminal is indicated using an AID, AP1 can decide the MAC address of the transmission permission terminal on the basis of the mapping information shared in advance with AP2 and acquire information of multi-user communication of an uplink on the AP2 side.

In the BSS 1 side, when time T15 that is a transmission timing of a trigger frame designated by the Schedule frame transmitted at time T13 comes, AP1 sets random waiting time (Backoff) by the collision avoidance mechanism and then transmits a trigger frame. This trigger frame includes information for permitting the wireless terminals STA1a and STA1b for transmission.

In a case where STA1a and STA1b are in temporary suspension, when a transmission timing of a trigger frame from AP1 approaches, then they return into ordinary operation and receive a trigger frame from AP1. Then at time T16 designated by the trigger frame, STA1a and STA1b simultaneously transmit a frame "Frame" to AP1 to carry out multi-user communication of an uplink. When AP1 receives a frame from each of the wireless terminals STA1a and STA1b, it returns a confirmation response frame "M-BA."

Also in the BSS 2, when time T17 that is a transmission timing of a trigger frame designated by the Schedule frame transmitted at time T14 from AP2 comes, after random waiting time (Backoff) is set by the collision avoidance mechanism, a trigger frame "Trigger" is transmitted.

In a case where STA2a and STA2b are in temporary suspension, when the transmission timing of a trigger frame from AP2 approaches, they return into ordinary operation and receive the trigger frame from AP2. Then, STA2a and STA2b simultaneously transmit a frame "Frame" to AP2 to carry out multi-user communication of an uplink at time T6 designated by the trigger frame. In response to this, a confirmation response frame "M-BA" is returned from AP2.

Thereafter, each BSS repetitively carries out transmission of a Schedule frame and a trigger from the base station and multi-user communication of an uplink by the subordinate wireless terminals in a communication sequence similar to that described above.

According to the communication sequences depicted in FIGS. 3 and 5, by transmitting schedule information by a method by which AP1 and AP2 can mutually receive the same, it is possible for them to share schedule information relating to multi-user communication of an uplink of each other. As a result, AP1 and AP2 can prevent collision of trigger frames or transmission of a trigger frame outside a schedule.

Further, each AP transmits schedule information including information relating to transmission of a trigger frame, and by this, the trigger frame can be prevented from not being received by any STA even if a period during which the STAs subordinate of APs temporarily suspend its operation is set. Further, each STA can temporarily suspend operation to reduce power consumption during a period until a transmission timing of a trigger frame approaches and can receive a trigger frame with certainty to carry out multi-user communication of an uplink.

Further, where AP1 and AP2 share information relating to resources such as a transmission frequency, transmission power, a modulation encoding method, a permissible interference level and so forth to be used in multi-user communication of an uplink by AP1 and AP2, simultaneous communication in different frequencies or simultaneous communication based on space re-utilization can be implemented and communication can be performed efficiently.

Working Example 2

In the working example 2, in a situation in which base stations cannot receive a signal therebetween, a frame including schedule information relating to multi-user communication of an uplink is relayed by a subordinate wireless terminal to a wireless terminal of a different BSS.

Figure 12:
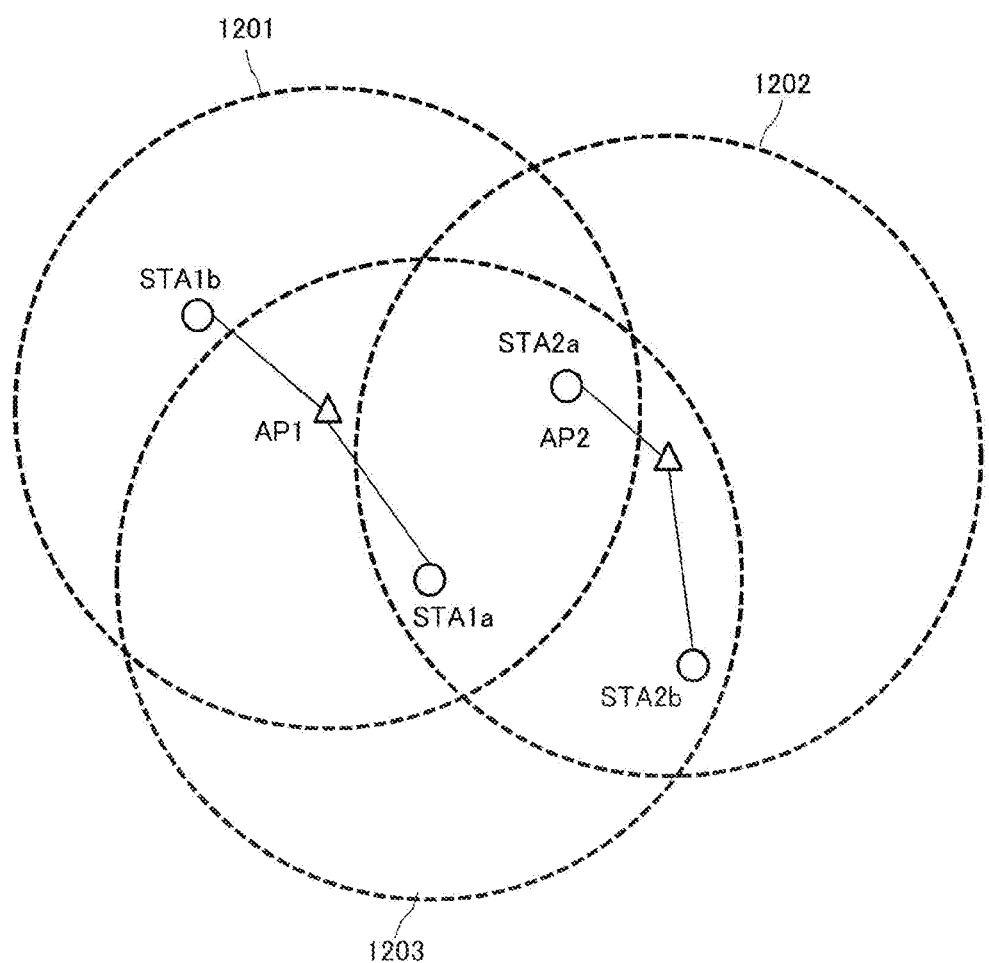
FIG. 12 is a view exemplifying a network topology assumed in the working example 2.

FIG. 12 exemplifies a network topology supposed in the working example 2. AP2 does not exist in a signal reach 1201 of AP1 and AP1 does not exist in a signal reach 1202 of AP2 either, and AP1 and AP2 do not directly receive a transmission frame from each other. However, both of AP1 and AP2 exist in a signal coverage 1203 of STA1a, and AP1 can receive schedule information of AP2 through relay of subordinate STA1a thereof. Further, though not depicted, AP1 and AP2 exist in a signal coverage of STA2b, and AP2 can receive schedule information of AP1 by relay of subordinate STA2b thereof.

Figure 6:
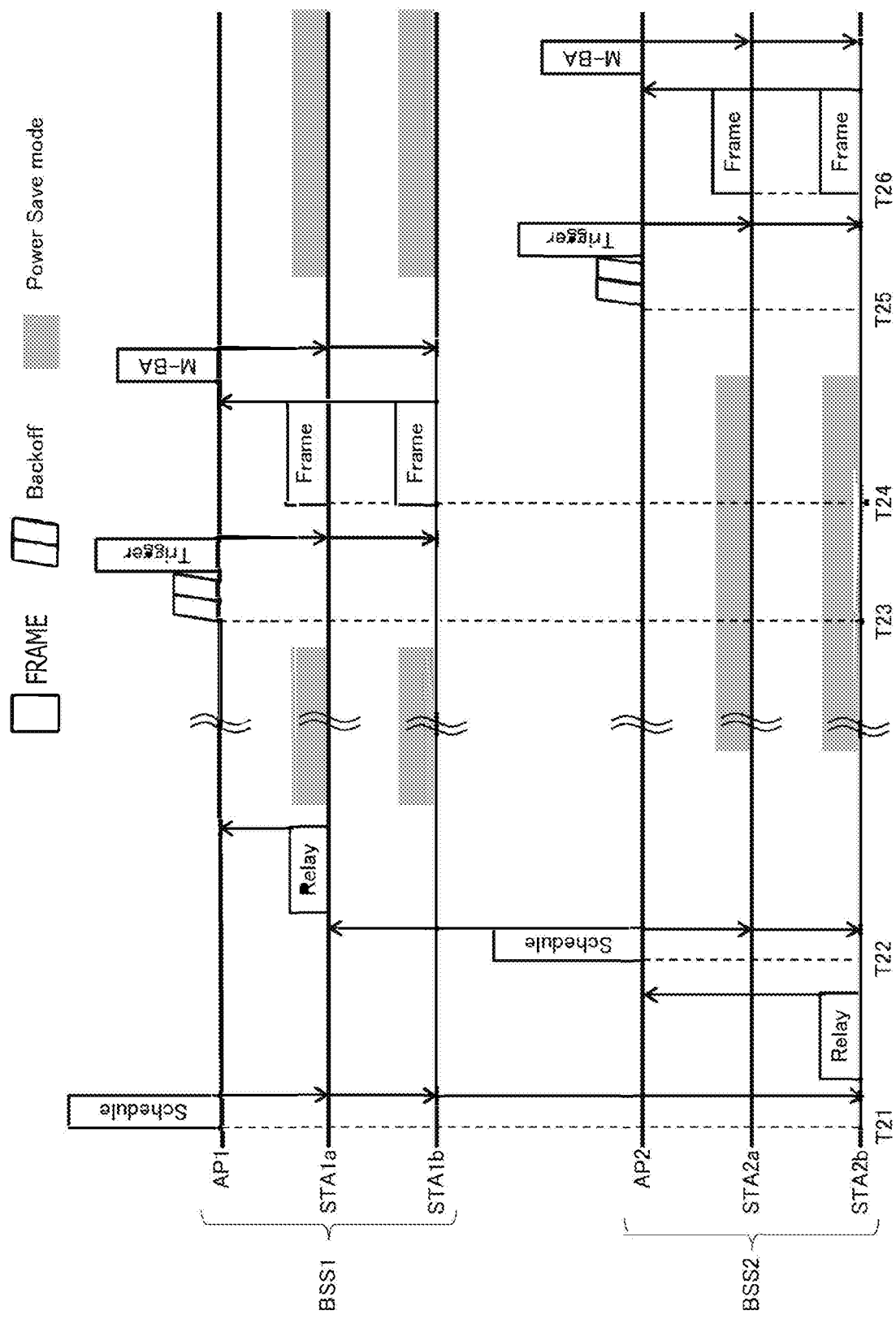
FIG. 6 is a view depicting an example of a communication sequence (working example 2) supposed in the wireless network configuration depicted in FIG. 1.

FIG. 6 depicts an example of a communication sequence supposed in the wireless network configuration depicted in FIG. 1. It is to be noted that the axis of abscissa of FIG. 6 is a time axis, and the notation method of a frame, waiting time, a temporary suspension state and so forth on each axis is similar to that of the example of a communication sequence depicted in FIG. 3.

Before the sequence of communication depicted in FIG. 6 is started, AP1 and AP2 may individually carry out, with the subordinate wireless terminals STA1a and STA1b and the subordinate wireless terminals STA2a and STA2b, respectively, a confirmation sequence for confirming whether or not each subordinate wireless terminal is ready for reception of a frame including information relating to scheduled communication. Further, the confirmation sequence may be carried not between each of the APs and each subordinate STA but between AP1 and AP2.

If AP1 determines schedule information relating to multi-user communication of an uplink in the BSS of AP1 itself, then it transmits the schedule information determined by AP1 itself at time T21 as a Schedule frame similarly as in the working example 1. This Schedule frame is received by the subordinate wireless terminals STA1a and STA1b of AP1. However, although this Schedule frame is not received by the different base station AP2, it is received by the wireless terminal STA2b subordinate of AP2. The Schedule frame is transmitted simultaneously with a beacon frame or may be part of the beacon frame. The beacon frame in the latter case may include a flag indicating that it includes schedule information.

If the wireless terminals STA1a and STA1b grasp a transmission schedule of a trigger frame of AP1 on the basis of the schedule information received from AP1, then they temporarily suspend during a period till time T23 that is a transmission timing of a next trigger frame from AP1.

Meanwhile, STA2b transmits relay information including information similar to the schedule information received from the base station AP1 other than any connection destination as a frame "Relay" to AP2 to which STA2b itself is connected. STA2b may transmit this Relay frame after a fixed period of time elapses after it completes the reception of the schedule information from AP1.

AP2 determines, on the basis of the schedule information associated with the BSS 1 side received from subordinate STA2b (namely, related by STA2b) and other information AP2 itself has, schedule information relating to multi-user communication of an uplink to its subordinate wireless terminals STA2a and STA2b.

Then, AP2 transmits a Schedule frame including the schedule information determined by AP2 itself at time T22. This Schedule frame is received by the subordinate wireless terminals STA2a and STA2b of AP2. However, although this Schedule frame is not received by the different base station AP1, it is received by the wireless terminal STA1a subordinate of AP1.

If the wireless terminals STA2a and STA2b grasp a transmission schedule of a trigger frame of AP2 on the basis of the schedule information received from AP2, then they temporarily suspend during a period till time T25 that is a transmission timing of a next trigger frame.

Further, STA1a transmits relay information including information similar to the schedule information received from the base station AP2 other than any connection destination as a Relay frame to AP1 to which it itself is connected. STA1a may transmit this Relay information after a fixed period of time elapses after it completes the reception of the schedule information from AP2.

AP1 can determine, on the basis of the schedule information associated with the BSS 2 side received from subordinate STA1a (namely, relayed by STA1a) and other information AP1 itself has, schedule information relating to multi-user communication of an uplink to the subordinate wireless terminals STA1a and STA1b after this.

In the BSS 1, when time T23 that is a transmission timing of a trigger frame designated by the Schedule frame transmitted at time T21 comes, AP1 first sets random waiting time (Backoff) by the collision avoidance mechanism and then transmits a trigger frame "Trigger." This trigger frame includes information for permitting the wireless terminals STA1a and STA1b for transmission.

In the case where STA1a and STA1b are in temporary suspension, when the transmission timing of a trigger frame from AP1 approaches, they return into ordinary operation and receive the trigger frame from AP1. Then, STA1a and STA1b simultaneously transmit a frame "Frame" to AP1 to carry out multi-user communication of an uplink at time T24 designated by the trigger frame. When AP1 receives a frame from each of the wireless terminals STA1a and STA1b, it returns a confirmation response frame "M-BA."

Also in the BSS 2, if time T25 that is a transmission timing of a trigger frame designated by the Schedule frame transmitted at time T22 from AP2 comes, AP2 first sets random waiting time (Backoff) by the collision avoidance mechanism and then transmits a trigger frame "Trigger."

In the case where STA2a and STA2b are in temporary suspension, when the transmission timing of a trigger frame from AP2 approaches, they return into ordinary operation and receive the trigger frame from AP2. Then, STA2a and STA2b simultaneously transmit a frame "Frame" to AP2 to carry out multi-user communication of an uplink at time T26 designated by the trigger frame. In response to this, a confirmation response frame "M-BA" is returned from AP2.

Thereafter, in each BSS, transmission of a Schedule frame, transmission of relay information and transmission of a trigger frame from the base station and multi-user communication of an uplink by the subordinate wireless terminals are carried out repetitively by a communication sequence similar to that described above.

It is to be noted that, in the example of the communication sequence depicted in FIG. 6, in a case where it is intended to indicate transmission permission information using an AID in schedule information, it is sufficient if mapping information for associating MAC addresses and AIDs with each other is shared in advance by the base stations AP1 and AP2. Further, the base stations AP1 and AP2 may receive mapping information of each other by relay of the wireless terminal STA1a or STA2b subordinate of each of them.

According to the communication sequence depicted in FIG. 6, even if AP1 and AP2 are in a positional relationship in which they cannot receive from each other, they can acquire schedule information relating to multi-user communication of an uplink of each other by receiving relay information from the respective subordinate wireless terminals STA1a and STA2b of them. Accordingly, similarly as in the working example 1, AP1 and AP2 can prevent collision of trigger frames or transmission of a trigger frame outside a schedule.

Each wireless terminal may spontaneously perform transmission of relay information to a base station of a connection destination of the wireless terminal itself or perform such transmission in response to a request from the base station of the connection destination of the wireless terminal itself. Further, each wireless terminal may transmit relay information after a fixed period of time elapses after it completes reception of schedule information from the different base station.

There is the possibility that a plurality of wireless terminals connected to a same base station may transmit relay information simultaneously and may be received in an overlapping relationship by the base station. Therefore, the Relay frames to be transmitted from the wireless terminals may all have a same configuration and contents such that they are transmitted by a method by which, even if a plurality of Relay frames overlap with each other, they can be received by a base station.

Further, each base station may notify its subordinate wireless terminals of information relating to schedule information of a different base station held by the base station itself. Then, in a case where each wireless terminal itself holds schedule information that is not held by a base station of a connection notification, the wireless terminal may transmit relay information or issue a notification that it holds the relay information.

Here, the notification that is issued from the base station to its subordinate wireless terminals may be a notification of schedule information of a different base station or of an identifier of the different base station or else may be schedule information of the base station itself determined on the basis of schedule information of a different base station.

Further, a wireless terminal may notify a base station of a connection destination thereof of information relating to schedule information held by the wireless terminal itself, and the base station may issue a request for transmission of relay information in a case where it decides that schedule information that is not held by the base station itself is held by the wireless terminal.

It is to be noted that, although the example of a communication sequence in which a base station receives relay information from a wireless terminal to which the base station itself is connected is depicted in FIG. 6, the base station may otherwise receive relay information from a wireless terminal that is not connected to the base station itself (or that is connected to a different base station).

Figure 7:
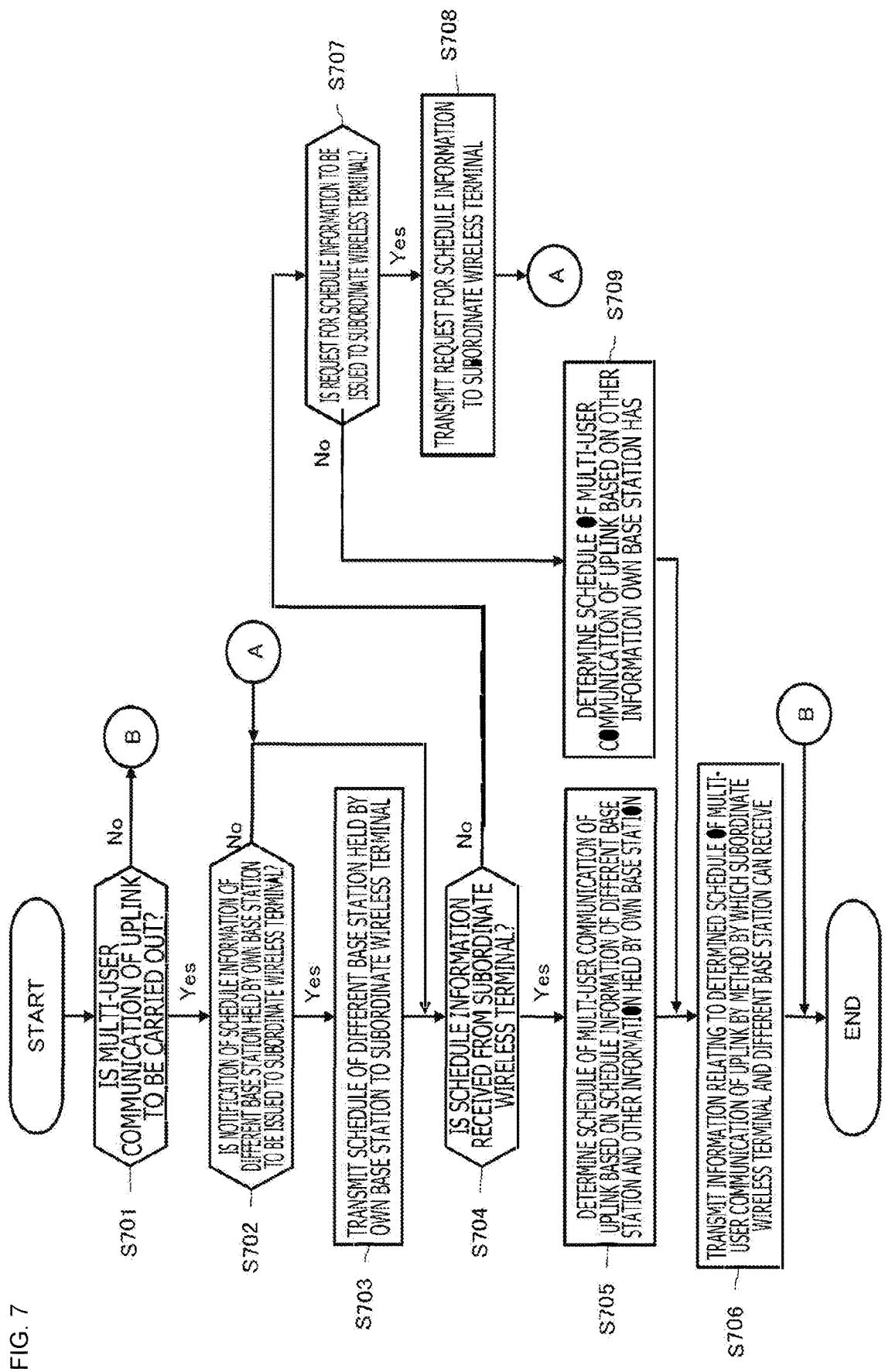
FIG. 7 is a flow chart (working example 2) depicting a processing procedure for allowing a base station to perform communication operation.

FIG. 7 depicts a processing procedure for allowing a base station in the present working example to perform communication operation in the form of a flow chart. This processing procedure is carried out principally, for example, by the control section 202 of the communication apparatus 200 depicted in FIG. 2 (that operates as a base station).

In the case where the base station is to carry out multi-user communication of an uplink in the BSS of the base station itself (Yes at step S701), it subsequently determines whether or not it is to notify its subordinate wireless communications of schedule information of a different base station held by the base station itself (step S702).

In a case where the base station is to notify (Yes at step S702), it transmits schedule information of the different base station held by the base station itself to its subordinate wireless terminals (step S703). It is to be noted that the base station transmits the schedule information of the base station itself in a frame that can be received not only by the subordinate wireless terminals but also by a different base station and wireless terminals connected to the different base station. On the other hand, in the case where the base station is not to carry out multi-user communication of an uplink (No at step S701), it ends the present processing skipping all succeeding processes.

Then, the base station checks whether or not schedule information of a different base station is received from its subordinate wireless terminal (namely, whether or not schedule information of the different base station is relayed from a subordinate wireless terminal) (step S704).

When the base station receives schedule information of a different base station from a subordinate wireless terminal thereof (Yes at step S704), it determines schedule information for carrying out multi-user communication of an uplink in the BSS of the base station itself on the basis of the schedule information of the different base station and other information the base station itself has (step S705).

On the other hand, when the base station cannot receive schedule information of a different base station from any subordinate wireless terminal (No at step S704), it decides whether or not it is to issue a request for transmission (or relay) of schedule information of the different base station to the subordinate wireless terminal (step S707).

In a case where the base station is to issue a request for transmission of schedule information of the different base station to the subordinate wireless terminal (Yes at step S707), it issues a request for transmission of the schedule information of the different base station to the subordinate wireless terminal (step S708), whereafter it returns to step S704, at which it waits for reception of a subordinate wireless terminal.

On the other hand, in a case where the base station is not to issue a request for transmission of schedule information of the different base station to the subordinate wireless terminal (No at step S707), it determines schedule information for carrying out multi-user communication of an uplink in the BSS of the base station itself on the basis of the other information the base station itself has (step S709). The other information the base station itself has may be, for example, an attribute, a buffer state, a communication resource state, a previous communication result and so forth.

At step S705 or S709, the base station determines, as schedule information, a schedule for transmission of a trigger frame to its subordinate wireless terminals, and information relating to a transmission frequency, transmission power, a modulating encoding method, a permissible interference level and so forth to be used for transmission of the trigger frame, and information of a resource, transmission permission terminals, a transmission permission traffic, other communication parameters and so forth to be used in multi-user communication of an uplink to be induced by the trigger frame.

Then, the base station transmits the scheduled information determined at step S705 or S709 by a method by which it can be received simultaneously also by a different base station together with its subordinate wireless terminals (step S706) and then ends the present processing.

At step S706, the base station transmits a frame in which the schedule information is placed including, for example, destination addresses that can be received, for example, by its subordinate wireless terminals, the different base station and the wireless terminals connected to the different base station. Further, the base station may transmit a Schedule frame including the schedule information simultaneously with a beacon frame, or the schedule information may be transmitted as part of the beacon frame. The beacon frame in the latter case may include a flag indicating that it includes schedule information.

After the base station carries out communication operation by such a processing procedure as depicted in FIG. 7, it transmits a trigger frame in accordance with the determined schedule information. Further, each wireless terminal subordinate of the base station receives a trigger frame from the base station in accordance with the received schedule information and besides carries out multi-user communication of an uplink to the base station between wireless terminals between which transmission is permitted by the trigger frame (refer to FIG. 6). Also, a wireless terminal connected to the different base station can receive the schedule information and can relay the schedule information to the base station to which the wireless terminal itself is connected.

Figure 8:
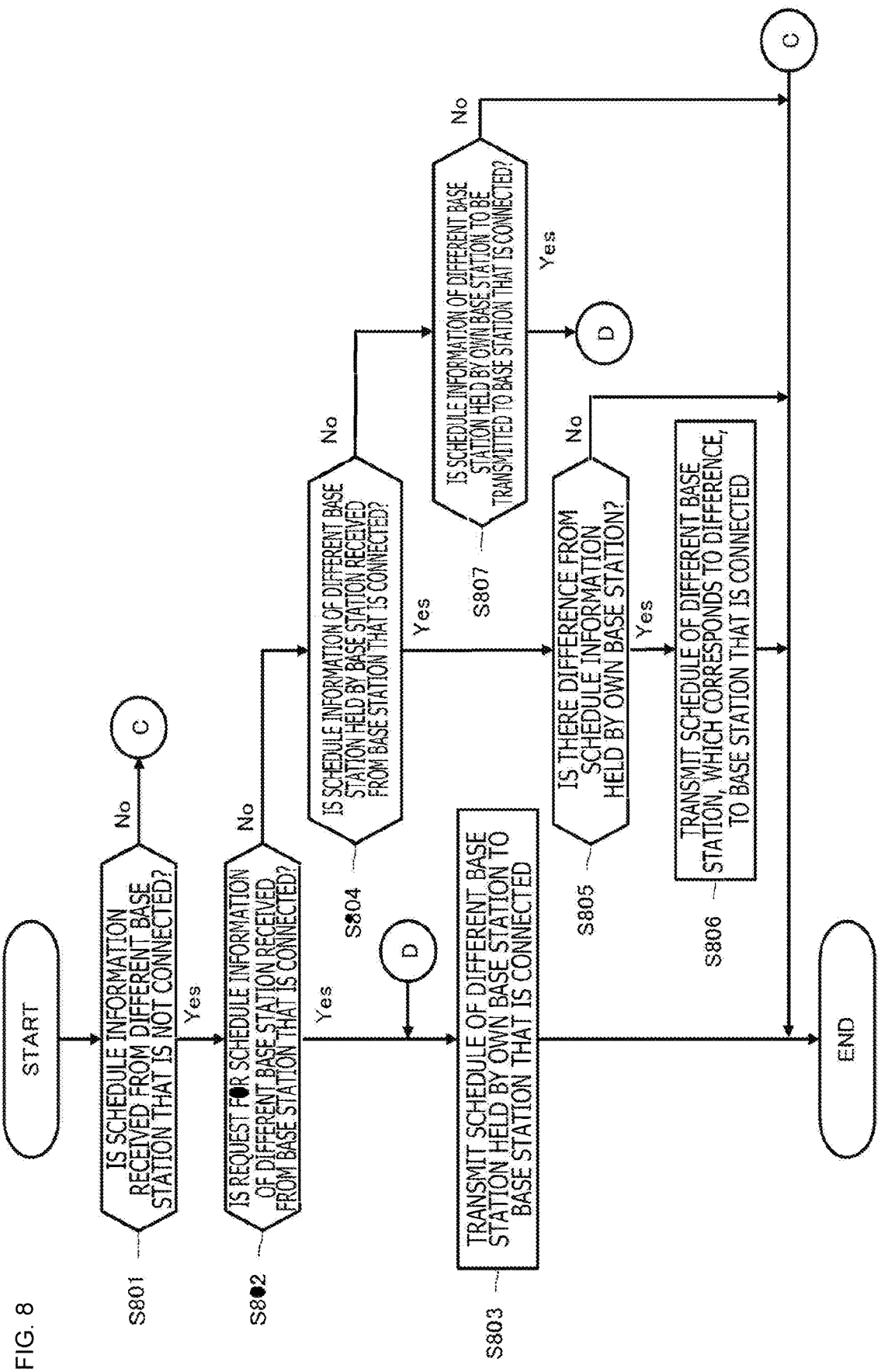
FIG. 8 is a flow chart (working example 2) depicting a processing procedure for allowing a wireless terminal to perform communication operation.

Meanwhile, FIG. 8 depicts a processing procedure for allowing a wireless terminal in the present working example to perform communication operation in the form of a flow chart. This processing procedure is carried out principally, for example, by the control section 202 of the communication apparatus 200 depicted in FIG. 2 (which operates as a wireless terminal).

When the wireless terminal receives schedule information from a base station that is not a connection destination of the wireless terminal (Yes at step S801), it holds the received schedule information. Then, the wireless terminal checks whether or not it receives information relating to a transmission request for schedule information of a different base station (or a request for relay of schedule information) from the base station of the connection destination of the wireless terminal itself (step S802).

Here, in a case where the wireless terminal has received information relating to a transmission request for schedule information of the different base station from the base station of the connection terminal of the wireless terminal itself (Yes at step S802), it transmits the schedule information received from the base station other than the connection destination at step S801 to the base station of the connection destination of the wireless terminal itself (step S803) and then ends the present processing.

On the other hand, in a case where the wireless terminal has not received information relating to a transmission request for schedule information of the different base station from the base station of the connection destination of the wireless terminal (Yes at step S802), it checks whether or not it receives, from the base station of the wireless terminal itself, information relating to schedule information of the different base station held by the base station (step S804).

Here, in a case where the wireless terminal receives information relating to schedule information of the different base station held by the base station of the connection destination of the wireless terminal from the base station (Yes at step S804), it further checks whether or not there is a difference between the schedule information of the different base station received from the base station of the connection destination of the wireless terminal itself and the schedule information of the base station other than the connection destination held by the wireless terminal itself (step S805).

In a case where the schedule information of the different base station received from the base station of the connection destination of the wireless terminal itself has a difference from the schedule information of the base station other than the connection destination held by the wireless terminal itself holds (Yes at step S805), the wireless terminal transmits only the schedule information of the different base station corresponding to the difference to the base station of the connection destination of the wireless terminal itself (step S806), and ends the present processing. On the other hand, in a case where the schedule information received from the base station of the connection destination of the wireless terminal has no difference from the schedule information of the different base station held by the wireless terminal itself (No at step S805), the wireless terminal ends the present processing immediately without transmitting the schedule information received from the different base station to the base station of the connection destination.

On the other hand, in a case where the wireless terminal has not received schedule information of the different base station held by the base station of the connection destination of the wireless terminal from the base station of the connection terminal (No at step S804), it determines whether or not it is to transmit (or relay) the schedule information of the base station other than the connection destination held by the wireless terminal itself to the base station of the connection destination of the wireless terminal itself (step S807).

At step S807, the wireless terminal may issue, for example, an inquiry about whether it is to transmit schedule information of the base station other than the connection destination held by the wireless terminal to the base station of the connection destination of the wireless terminal itself and determine whether or not the schedule information is to be transmitted in response to a replay to the inquiry from the base station. For example, the wireless terminal may transmit not the schedule information itself of the base station other than the connection destination held by the wireless terminal but the information relating to the holding of the schedule information of the base station other than the connection destination to the base station of the connection destination of the wireless terminal itself to make an inquiry.

As an alternative, at step S807, the wireless terminal may determine, in response to whether or not schedule information of the base station other than the connection destination held by the wireless terminal is new (namely, whether or not the schedule information is information including a schedule that does not elapse), whether or not the schedule is to be transmitted to the base station of the connection destination of the wireless terminal itself.

In a case where the wireless terminal determines that it is to transmit schedule information of the base station other than the connection destination held by the wireless terminal itself to the base station of the connection destination of the wireless terminal itself (Yes at step S807), it transmits the schedule information of the base station other than the connection destination held by the wireless terminal itself to the base station of the connection destination of the wireless terminal (step S803) and ends the present processing.

On the other hand, in a case where the wireless terminal determines that it is not to transmit the schedule information of the wireless station other than the connection destination held by the wireless station itself to the base station of the connection destination of the wireless station itself (No at step S807), the wireless terminal ends the processing immediately.

Finally, a configuration of a frame that is utilized in the working example 1 and the working example 2 described hereinabove is described with reference to FIGS. 9A, 9B, 9C and 10.

FIG. 9A depicts an example of a configuration of a Schedule frame that is utilized when schedule information of a base station is transmitted. Although the Schedule frame is a frame for transmission destined to its subordinate wireless terminal, it is transmitted by a method by which it can be received simultaneously also by a different base station or a wireless terminal connected to the different base station (described hereinabove).

The Frame Control field is a region for storing information relating to MAC frame control and includes information relating to a type of the frame. The Duration field is a region for storing a planned period during which a wireless line is used by the frame transmission.

The Receiver Address field is a region for storing a destination address of this frame. In the Receiver Address field of the Schedule field, a destination address that can be received by subordinate wireless terminals, a different base station and wireless terminals connected to the different base station is described, for example, in the form of a MAC address.

The Transmitter Address field is a region for storing a transmission source of this frame. In the Transmitter Address field of the Schedule frame, an address of a base station that is a transmission source is described, for example, in the form of a MAC address.

In the Schedule field, schedule information relating to "scheduled communication," namely, to multi-user communication of an uplink, determined by the base station that is a transmission source of this frame is described. In particular, in the Schedule field, information relating to a transmission schedule of a trigger frame for inducing multi-user communication of an uplink is described. As the information relating to a transmission schedule of a trigger frame, for example, a transmission timing of a trigger frame is described in the form of absolute time, relative time, a cycle, an interval or a number of times. Further, in the Schedule field, also information relating to a transmission frequency, transmission power, a modulation encoding method and a permissible interference level and also information relating to a resource to be used in transmission of a trigger frame and a transmission method of a trigger frame are described.

In the Trigger Information field, information relating to multi-user communication to be induced by a trigger frame that is a target (or for which a transmission schedule is indicated in the Schedule field) is described mainly. In particular, the information includes information relating to a resource or a transmission method of multi-user communication of an uplink to be used in transmission of the multi-user communication of an uplink (a transmission frequency, transmission power, a modulation encoding method and a permissible interference level to be used), transmission permission terminal information of transmission permission terminals to which multi-user communication of an uplink is permitted, transmission permission traffic information, communication parameters and so forth. The transmission permission terminal information is indicated by an AID.

Information described in the Trigger Information field configures "scheduled communication," namely, "schedule information" relating to multi-user communication of an uplink, together with information described in the Schedule field.

It is to be noted that it is presupposed that, between base stations, mapping information for associating a MAC address that is a unique identifier of each wireless terminal subordinate to each of the base stations and an AID that is a restrictive (in the BSS) identifier is shared in advance. Accordingly, the transmission permission terminal information can be indicated using not a MAC address of the 48-bit length but an AID of the 11-bit length, and the data length of the Trigger Information field can be reduced.

Then, to the tail end of the Schedule frame, an FCS (frame check sequence) is added as information for error detection.

Meanwhile, FIG. 9B depicts an example of a configuration of a Relay frame to be used when a wireless terminal relays schedule information received from a different base station to a base station of a connection destination in the working example 2. The Relay frame is a frame for allowing a wireless terminal to transmit schedule information received from a base station other than the connection destination to a base station of the connection destination of the wireless terminal itself described hereinabove).

Information described in Frame Control, Duration, Receiver Address and Transmitter Address fields of the Relay field is similar to that of the Schedule frame depicted in FIG. 9A.

In the Receiver Address field of the Relay frame, as a transmission destination of the frame, for example, a destination address of a base station that is a connection destination of a wireless terminal of a transmission source is described in the form of a MAC address.

Meanwhile, in the Transmitter Address field of the Relay frame, an address indicating a relay may be placed in order to make an address same between or among a plurality of wireless terminals. Otherwise, the description of the Transmitter Address field may be omitted or the Transmitter Address field itself may be omitted.

In the Source Address field, an address of a base station that is a transmission source of the schedule information (a different base station that is not the connection destination of the wireless terminal that is the transmission source of the Relay frame).

Further, information described in the succeeding Schedule Trigger Information and FCS fields is similar to that of the Schedule frame depicted in FIG. 9A.

A wireless terminal that is to transmit a Relay frame places schedule information read from the Schedule and Trigger Information fields in the Schedule frame received from a base station other than the connection destination of the wireless terminal itself into the Schedule and Trigger Information fields in the Relay frame to be transmitted from the wireless terminal itself, respectively. However, in a case where the wireless terminal has received schedule information in a different base station from the base station of the connection destination of the wireless terminal itself, it may otherwise place only differences of the received schedule information into the Schedule and Trigger Information fields and transmit the Relay frame. Further, schedule information whose time has elapsed already should not be transmitted.

FIG. 9C depicts an example of a configuration of an information element into which mapping information is to be placed in a frame that is utilized when mapping information for associating a plurality of kinds of identifiers of a plurality of wireless terminals subordinate of each of a plurality of base stations between the plurality of wireless stations in the working example 1 (FIG. 5). This information element may be transmitted using a MAPPING frame for exclusive use as in the communication sequence depicted in FIG. 5 or may be transmitted with such an element as depicted in FIG. 9C added to a frame different from the MAPPING frame.

In the Element ID field, an identifier of this information element is included. Further, in the Length field, a length of this information element is included.

In the Repeat Number field, the number of pieces of association information of the MAC address and the Association ID (AID) included in this information element is placed. In the MAC Address field, a MAC address of a terminal associated with the succeeding AID is included. In the Association ID field, an AID of a terminal (in a BSS) having a corresponding MAC address is included. The two fields of the MAC address field and the Association ID form one set and are repeated by a number of times equal to the number indicated in the Repeat Number field.

Figure 10:
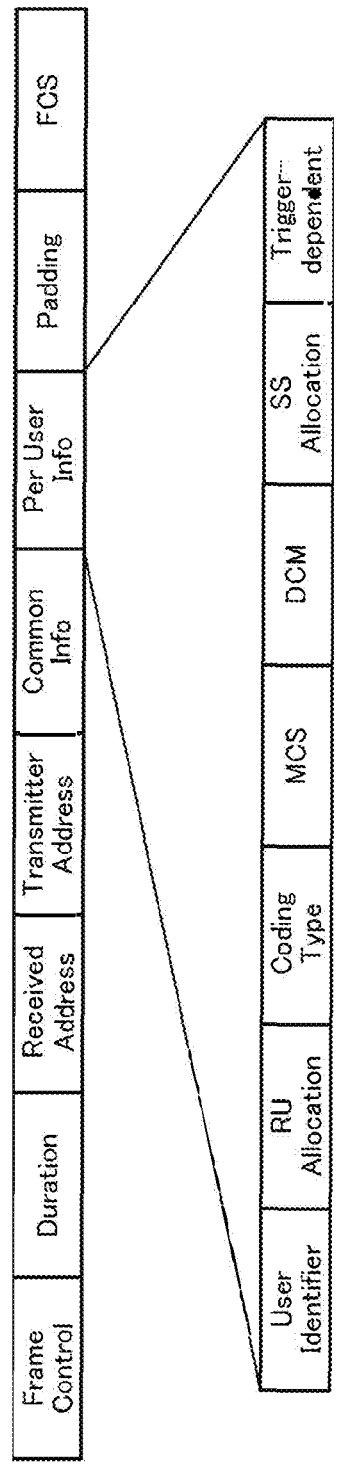
FIG. 10 is a view depicting an example of a configuration of a trigger frame.

FIG. 10 depicts an example of a configuration of a trigger frame that is transmitted from a base station to a subordinate wireless terminal. The trigger frame is a frame that is transmitted from a base station to its subordinate wireless terminal in order to induce multi-user communication of an uplink in the subordinate wireless terminal, and particularly, information relating to wireless terminals to which multi-user communication of an uplink is to be permitted is described in the trigger frame.

Information described in the Frame Control, Duration, Receiver Address and Transmitter Address fields of the trigger frame is similar to that of the Schedule frame depicted in FIG. 9A.

In the Receiver Address field of the trigger frame, a broadcast address or an address indicative of a trigger frame is placed. Further, in the Transmitter Address field of the Trigger frame, an address of the base station that is a transmission source of the trigger frame is described, for example, in the form of a MAC address.

The Common Info field is a region in which information that can be referred to by all subordinate wireless terminals is placed, and the information includes, for example, a PPDU (PLCP (Physical Layer Convergence Protocol) Protocol Data Unit) length and frame header information of the PHY layer.

The Per User Info field is a region into which information that can be referred to individually by subordinate wireless terminals is placed, and the Per User Info field is repetitively provided by a number equal to the number of wireless terminals in which frame transmission is induced by this trigger frame (namely, multi-user communication of an uplink is permitted), and information for each wireless terminal to which transmission is permitted is described in the Per User Info field.

Then, by the Padding field, the frame length of the trigger field is adjusted, and an FCS for error correction is added to the tail end.

In one Per User Info field, User Identifier, RU Allocation, Coding Type, MCS, DCM, SS Allocation and Trigger-dependent fields are provided.

The User Identifier field is a region indicative of an AID of a wireless terminal to which frame transmission is permitted in the trigger frame. In the succeeding RU Allocation, Coding Type, MCS, DCM, SS Allocation and Trigger-dependent fields, information relating to a wireless terminal indicated by an AID is placed.

The RU Allocation field is a region indicative of a resource unit (Resource Unit) that is used in multi-user communication of an uplink by the applicable wireless terminal.

The Coding Type field is a region indicative of an encoding method of a PPDU transmitted from the applicable wireless terminal. The MCS field is a region indicative of an MCS (Modulation and Coding Scheme) of a PPDU transmitted from the applicable wireless terminal (the MCS is information obtained by converting a combination of a modulation method, an encoding ratio and so forth into an index). The DCM field is a region indicative of whether or not Dual Carrier Modulation is to be used in a PPDC to be transmitted by the applicable wireless terminal.

The SS Allocation field is a region indicative of information of a spatial stream (Spatial Stream: SS) of a PPDU transmitted by the applicable wireless terminal. The Trigger-dependent field is a region for storing information according to a type of the trigger frame.

INDUSTRIAL APPLICABILITY

The technology disclosed in the present specification has been described in detail with reference to the specific embodiments. However, it is self-evident that modification or replacement of the embodiments can be made by those skilled in the art without departing from the subject matter of the technology disclosed in the present specification.

The technology disclosed in the present specification can be applied suitably to a wireless LAN system that complies, for example, with the IEEE 801.11ax standard. Further, the technology disclosed in the present specification can be applied to a wireless network environment in which a plurality of BSSs neighbor with each other and base stations configuring each BSS can receive a signal with each other and a wireless network environment in which, although base stations cannot receive a signal from each other, some wireless terminal belonging to one of the BSSs can receive a signal of the base station of the other BSS.

In short, the technology disclosed in the present specification has been described in the form of exemplification and the described contents of the present specification shall not be interpreted restrictively. In order to decide the subject matter of the technology disclosed herein, the claims should be referred to.

It is to be noted that also it is possible for the technology disclosed herein to have such configurations as described below.

(1) A communication apparatus, including:
a communication section configured to transmit and receive a wireless signal; and
a control section configured to control operation as a base station; and in which the control section controls transmission of a frame that includes schedule information relating to scheduled communication of the own station and is received by a different wireless terminal or controls reception of schedule information relating to scheduled information of a different base station.

(2) The communication apparatus according to (1) above, in which the scheduled communication includes multi-user communication of an uplink.

(3) The communication apparatus according to any one of (1) or (2) above, in which
the schedule information includes information relating to a transmission schedule of a frame for inducing multi-user communication of an uplink.

(3-1) The communication apparatus according to (3) above, in which the schedule information includes information relating to a resource or a transmission method to be used for transmission of a frame for inducing multi-user communication of an uplink.

(4) The communication apparatus according to any one of (1) to (3) above, in which
the schedule information includes information relating to a resource, information of a transmission permission terminal, a transmission permission traffic or a communication parameter to be used in multi-user communication of an uplink.

(5) The communication apparatus according to any one of (1) to (4) above, in which
the schedule information of a different base station is received from at least one of a wireless terminal connected to the own station, the different base station or a wireless terminal connected to the different base station.

(6) The communication apparatus according to any one of (1) to (5) above, in which
the frame that includes schedule information of the own station and is included in a destination address that is received by a wireless terminal connected to the own station, a different base station and a wireless terminal connected to the different base station is transmitted.

(7) The communication apparatus according to any one of (1) to (6) above, in which
the frame that includes schedule information of the own station is transmitted simultaneously with a beacon frame or as part of the beacon frame.

(8) The communication apparatus according to any one of (1) to (7) above, in which
the control section controls so as to perform, with a wireless terminal connected to the own station, the different base station or a wireless terminal not connected to the own station, a sequence for confirming whether or not the wireless terminal connected to the own station, the different base station or the wireless terminal not connected to the own station is ready for transmission and reception of the frame including schedule information.

(9) The communication apparatus according to any one of (1) to (8) above, in which
the control section controls scheduled communication of the own station based on received schedule information of a different base station.

(10) The communication apparatus according to any one of (1) to (9) above, in which
the control section determines, based on received schedule information of a different base station, a transmission schedule of a frame for inducing multi-user communication of an uplink, and a resource, information of a transmission permission terminal, a transmission permission traffic and a communication parameter to be used in the multi-user communication of an uplink.

(11) The communication apparatus according to any one of (1) to (10) above, in which
the control section controls so as to receive schedule information of a different base station after the frame including schedule information of the own station is transmitted.

(12) The communication apparatus according to any one of (1) to (11) above, in which
the control section controls so as to receive schedule information of a different base station after a transmission request for schedule information is transmitted.

(13) The communication apparatus according to any one of (1) to (12) above, in which
the control section controls transmission of information indicative of a corresponding relationship of a plurality of identifiers of wireless terminals connected to the own station.

(13-1) The communication apparatus according to any one of (1) to (13) above, in which
schedule information in which information of tipless elegance is described in an identifier with which the base station is identify a wireless terminal.

(14) A communication method in a communication apparatus that operates as a base station, including:
a step of transmitting a frame that includes schedule information relating to scheduled information of the own station and is received by a different wireless terminal; and
a step of receiving schedule information relating to scheduled communication of a different base station.

(15) A communication apparatus, including:
a communication section configured to transmit and receive a wireless signal; and
a control section configured to control operation as a wireless terminal subordinate of a first base station; in which
the control section controls reception of a frame including schedule information relating to scheduled communication from a second base station to which the own station is not connected and transmission of the schedule information of the second base station to the first base station.

(16) The communication apparatus according to (15) above, in which the control section controls so as to perform, with the first base station and the second base station, a sequence for confirming whether or not the first base station and the second base station are ready for transmission and reception of the frame including schedule information.

(17) The communication apparatus according to any one of (15) or (16) above, in which
the control section controls so as to transmit the schedule information of the second base station using a frame that has a configuration and contents partly or fully same as those of a different wireless terminal connected to the first base station.

(18) The communication apparatus according to any one of (15) to (17) above, in which
the control section controls so as to transmit, after information relating to holding of schedule information of the second base station is transmitted to the first base station, schedule information of the second base station held by the own station to the first base station.

(19) The communication apparatus according to any one of (15) to (18) above, in which
the control section controls so as to transmit, after information relating to holding of schedule information of the second base station is received from the first base station, the schedule information of the second base station held by the own station to the first base station.

(20) The communication apparatus according to any one of (15) to (19) above, in which
the control section controls so as to transmit, after information relating to a transmission request for schedule information of the second base station is received from the first base station, the schedule information of the second base station held by the own station to the first base station.

(21) The communication apparatus according to any one of (15) to (20) above, in which
the control section controls an operation mode of the communication apparatus based on schedule information of the first base station.

(22) A communication method in a communication apparatus that operates as a wireless terminal subordinate of a base station, including:
a step of receiving a frame including schedule information relating to scheduled communication from a different base station to which the own station is not connected; and
a step of transmitting the schedule information of the different base station to the base station to which the own station is connected.

REFERENCE SIGNS LIST

200 . . . Communication apparatus, 201 . . . Data processing section, 202 . . . Control section
203 . . . Communication section, 204 . . . Power supply section
211 . . . Modem section, 212 . . . Spatial signal processing section
213 . . . Channel estimation section, 214 . . . Wireless interface section
215 . . . Amplification section, 216 . . . Antenna

The invention claimed is:

1. An information processing apparatus, comprising:
circuitry configured to:
control a wireless communication unit of a first wireless communication apparatus to receive a first wireless signal, wherein
the first wireless signal includes a first identifier and first schedule information,
the first identifier is associated with the first wireless communication apparatus,
the first schedule information is associated with a first scheduled communication,
the first scheduled communication is associated with a first basic service set (BSS), and
the first wireless communication apparatus is not associated with the first BSS; and
control the first wireless communication apparatus to transmit a second wireless signal, wherein the second wireless signal includes the first schedule information and a second identifier of a second wireless communication apparatus associated with a second BSS different from the first BSS.

2. The information processing apparatus according to claim 1, wherein
the circuitry is further configured to determine second schedule information based on the first scheduled information,
the second schedule information is associated with a second scheduled communication,
the second schedule communication is associated with the second BSS, and
the first wireless communication apparatus is associated with the second BSS.

3. The information processing apparatus according to claim 2, wherein
the circuitry is further configured to control the wireless communication unit to transmit a third wireless signal,
the third wireless signal includes the second schedule information and a third identifier,
the third identifier is associated with a third wireless communication apparatus, and
the third wireless communication apparatus is associated with the first BSS.

4. The information processing apparatus according to claim 2, wherein the circuitry is further configured to determine the second schedule information based on at least one of:
  an attribute of a fourth wireless communication apparatus associated with the second BSS,
  a buffer state of the fourth wireless communication apparatus,
  a communication resource state of the fourth wireless communication apparatus, or
  a communication result of the fourth wireless communication apparatus.

5. The information processing apparatus according to claim 2, wherein
  the first scheduled communication is based on the second schedule information, and
  the second schedule information is associated with the second BSS.

6. The information processing apparatus according to claim 2, wherein
  the circuitry is further configured to determine, based on the second schedule information, a transmission schedule of a specific frame, and
  the specific frame includes the first schedule information.

7. The information processing apparatus according to claim 1, wherein the first schedule information is associated with the second BSS.

8. The information processing apparatus according to claim 1, wherein
  the second wireless signal includes a specific frame that includes the first schedule information and destination address, and
  the destination address is an address of the second wireless communication apparatus.

9. The information processing apparatus according to claim 8, wherein the specific frame is transmitted one of simultaneously with a beacon frame or as part of the beacon frame.

10. The information processing apparatus according to claim 1, wherein the circuitry is further configured to control the second BSS.

11. The information processing apparatus according to claim 1, wherein
  the circuitry is further configured to control reception of second schedule information,
  the second schedule information is associated with the second BSS,
  the second schedule information is received after transmission of the second wireless signal, and
  the second wireless signal includes the first schedule information.

12. The information processing apparatus according to claim 1, wherein
  the circuitry is further configured to:
    control a transmission of a transmission request; and
    control reception of second schedule information,
  the second schedule information is associated with the second BSS,
  the second schedule information is received after the transmission of the transmission request, and
  the transmission request is associated with the second schedule information.

13. The information processing apparatus according to claim 1, wherein
  the circuitry is further configured to control transmission of specific information,
  the specific information is associated with a plurality of identifiers,
  the plurality of identifiers is associated with a plurality of wireless communication apparatuses,
  the plurality of wireless communication apparatuses is connected to the first BSS,
  the plurality of wireless communication apparatuses includes the first wireless communication apparatus, and
  the plurality of identifiers includes the first identifier.

14. A method, comprising:
  controlling a first wireless communication unit of a first wireless communication apparatus to receive a first wireless signal, wherein
    the first wireless signal includes a first identifier and first schedule information,
    the first identifier is associated with the first wireless communication apparatus,
    the first schedule information is associated with a first scheduled communication,
    the first scheduled communication is associated with a first basic service set (BSS), and
    the first wireless communication apparatus is not associated with the first BSS; and
  controlling the first wireless communication apparatus to transmit a second wireless signal, wherein the second wireless signal includes the first schedule information and a second identifier of a second wireless communication apparatus associated with a second BSS different from the first BSS.

15. An information processing apparatus, comprising:
  circuitry configured to:
    control a wireless communication unit of a first wireless communication apparatus to receive a first wireless signal, wherein
      the first wireless signal includes a first schedule information and a first identifier,
      the first schedule information is associated with a first scheduled communication,
      the first identifier is associated with a second wireless communication apparatus,
      the first scheduled communication is associated with a first basic service set (BSS),
      the second wireless communication apparatus is associated with the first BSS,
      the first identifier is associated with a second BSS, and
      the first wireless communication apparatus is not associated with the second BSS; and
    control the first wireless communication apparatus to transmit a second wireless signal, wherein the second wireless signal includes the first schedule information and a second identifier associated with first wireless communication apparatus.

16. The information processing apparatus according to the claim 15, wherein the circuitry is further configured to:
  control the wireless communication unit to receive a third wireless signal, wherein
    the third wireless signal includes second schedule information and a third identifier,
    the second schedule information is associated with a second scheduled communication,
    the second scheduled communication is associated with the second BSS, and
    the second schedule information is based on the first schedule information.

17. The information processing apparatus according to the claim 16, wherein the circuitry is further configured to determine the second schedule information based on at least one of:
- an attribute of a third wireless communication apparatus associated with the second BSS,
- a buffer state of the third wireless communication apparatus,
- a communication resource state of the third wireless communication apparatus, or
- a communication result of the third wireless communication apparatus.

* * * * *